United States Patent [19]
Fitzgerald

[11] Patent Number: 5,109,692
[45] Date of Patent: * May 5, 1992

[54] DIAGNOSTIC APPARATUS AND METHOD FOR FLUID CONTROL VALVES

[75] Inventor: William V. Fitzgerald, McKinney, Tex.

[73] Assignee: Fisher Controls International Inc., Clayton, Mo.

[*] Notice: The portion of the term of this patent subsequent to Dec. 11, 2007 has been disclaimed.

[21] Appl. No.: 605,130

[22] Filed: Oct. 24, 1990

Related U.S. Application Data

[60] Division of Ser. No. 512,095, Apr. 10, 1990, Pat. No. 4,976,144, which is a continuation of Ser. No. 236,602, Aug. 25, 1988, abandoned.

[51] Int. Cl.⁵ .............. G01M 19/00; F16K 37/00; G01L 5/00
[52] U.S. Cl. .............. 73/168; 73/862.32; 137/487.5; 364/558
[58] Field of Search .............. 73/168, 37, 4 R, 862.32, 73/9; 137/487.5; 364/558, 550, 556

[56] References Cited

U.S. PATENT DOCUMENTS

| | | | |
|---|---|---|---|
| 2,569,299 | 9/1951 | Fegel | 73/4 R |
| 3,098,382 | 7/1963 | Hoffman et al. | 73/168 X |
| 4,029,122 | 6/1977 | Jaegtnes | 73/168 X |
| 4,274,438 | 6/1981 | LaCoste | 73/9 |
| 4,294,109 | 10/1981 | Peters et al. | 73/168 X |
| 4,325,399 | 4/1982 | Frick | 137/487.5 |
| 4,435,979 | 3/1984 | Gilgore | 73/168 |
| 4,464,931 | 8/1984 | Hendrick | 73/168 |
| 4,481,967 | 11/1984 | Frick | 137/487.5 |
| 4,523,286 | 6/1985 | Koga et al. | 73/9 |
| 4,542,649 | 9/1985 | Charbonneau et al. | 73/168 |
| 4,598,579 | 7/1986 | Cummings et al. | 73/168 X |
| 4,660,416 | 4/1987 | Charbonneau et al. | 73/168 |
| 4,672,310 | 6/1987 | Sayed | 324/133 |
| 4,682,491 | 7/1987 | Pickard | 73/168 X |
| 4,690,003 | 9/1987 | McNennamy et al. | 73/168 X |
| 4,693,113 | 9/1987 | McNennamy et al. | 73/168 |
| 4,705,067 | 11/1987 | Coffee | 137/487.5 |
| 4,707,796 | 11/1987 | Calabro et al. | 364/552 |
| 4,712,071 | 12/1987 | Charbonneau et al. | 324/415 |
| 4,719,587 | 1/1988 | Berte | 364/552 |
| 4,735,101 | 4/1988 | Charbonneau et al. | 73/862.32 |
| 4,761,999 | 8/1988 | Thompson | 73/168 |

FOREIGN PATENT DOCUMENTS 0264148 4/1988 European Pat. Off. .............. 73/168

*Primary Examiner*—William A. Cuchlinski, Jr.
*Assistant Examiner*—Diego F. F. Gutierrez
*Attorney, Agent, or Firm*—Marshall, O'Toole, Gerstein, Murray & Bicknell

[57] ABSTRACT

A method for diagnostically dynamic testing and determining the dynamic operating condition of a pneumatically operated fluid control valve assembly wherein a dynamic output of the valve assembly is compared in response to a dynamic input to the valve assembly. A controlled variable pneumatic pressure is supplied to the input of the valve positioner forming the dynamic input to move the flow control member. The controlled varying pressure is sensed to provide a first signal representing the dynamic input. The movement of the flow control member is sensed to obtain a second signal representing the responsive dynamic output, and the first and second signal are processed to develop valve diagnostic data, which is displayed to enable determination of the dynamic performance of the valve assembly under test.

6 Claims, 4 Drawing Sheets

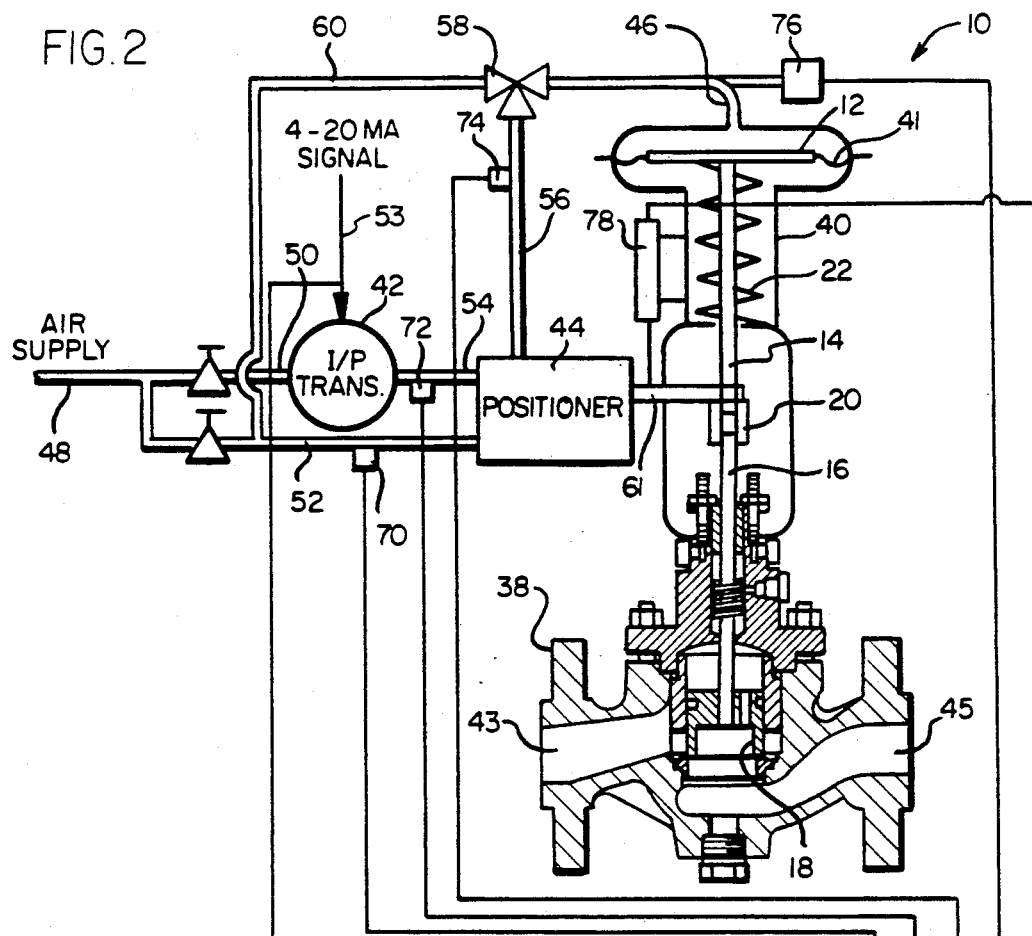
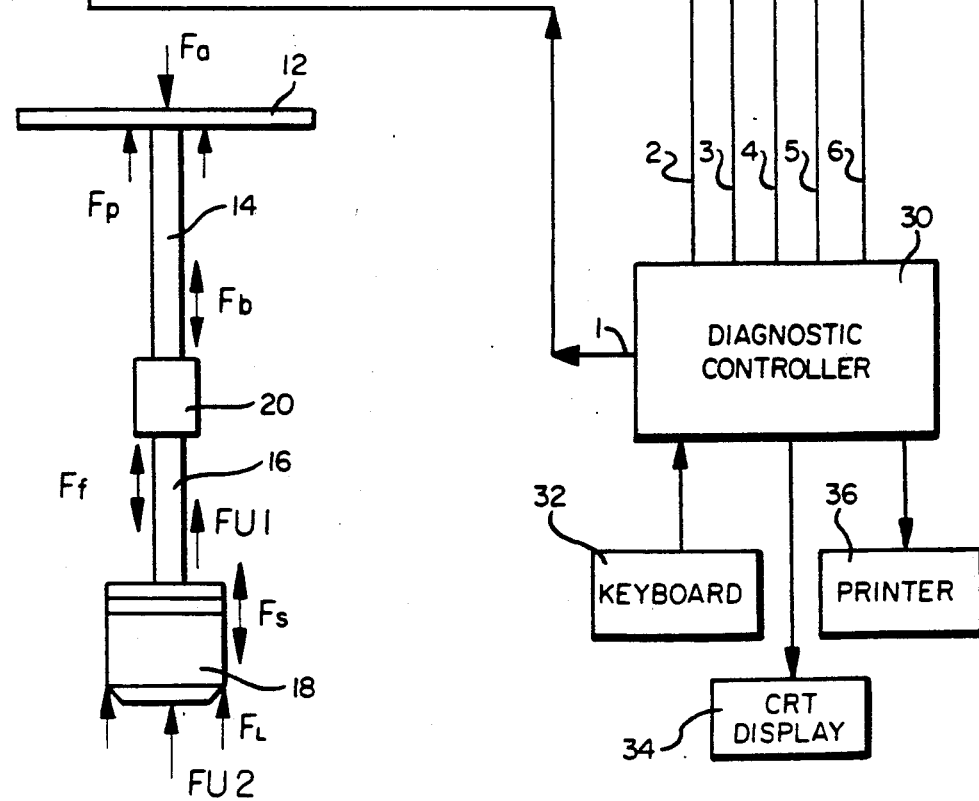

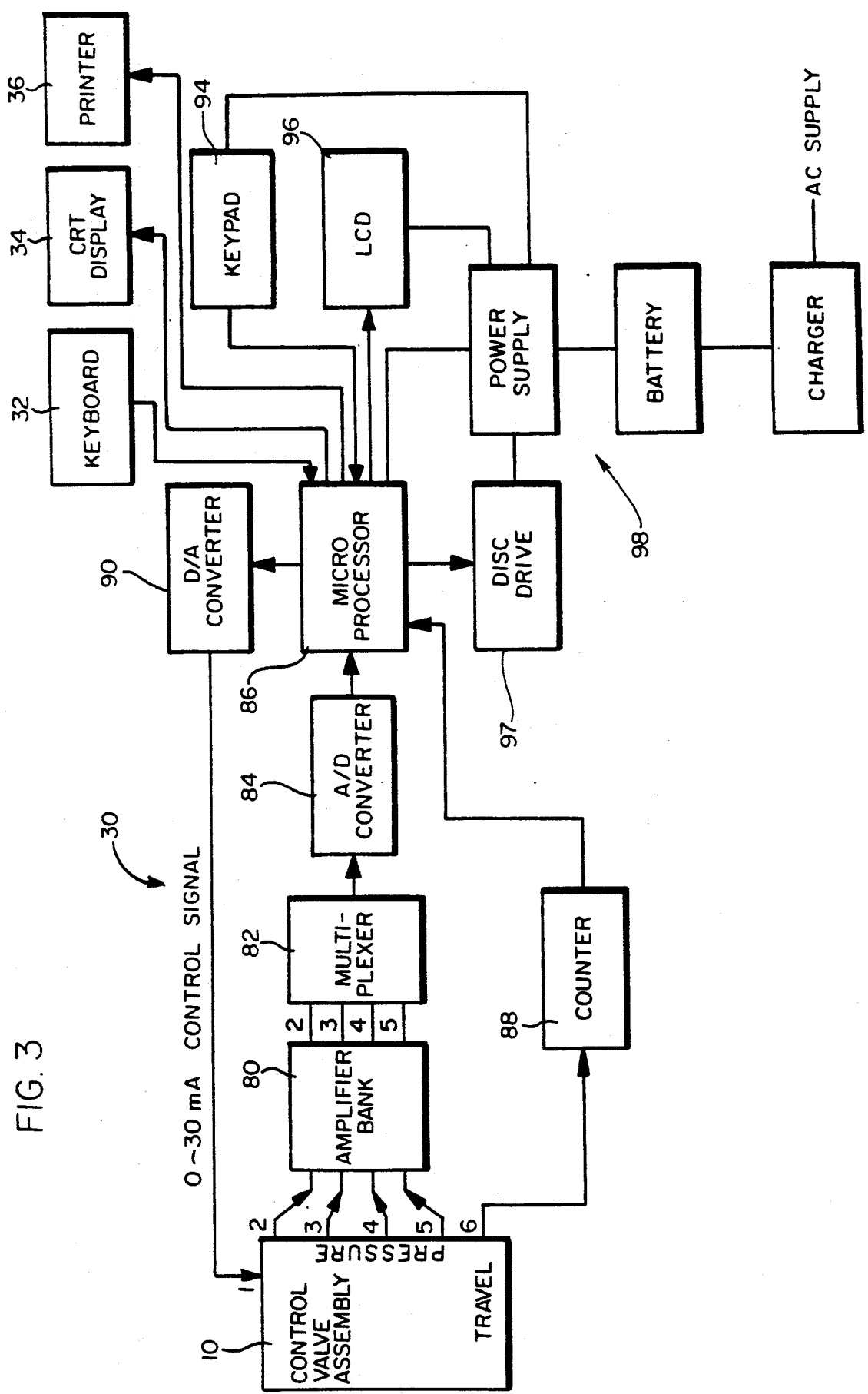

DIAGNOSTIC APPARATUS AND METHOD FOR FLUID CONTROL VALVES

This is a division of application Ser. No. 07/512,095, now U.S. Pat. 4,976,144, filed Apr. 10, 1990, now is a continuation of Ser. No. 07/236,602, filed Aug. 25, 1988, now abandoned.

Reference may be made to Appendix A containing a computer program listing applicable to the present invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to fluid control valves and more particularly to apparatus and a method for diagnostically testing and evaluating the condition of such valves, particularly pneumatically operated valves.

BACKGROUND OF THE INVENTION

Reference may be made to the following U.S. Pat. Nos. of interest: 4,542,649; 4,660,416; 4,690,003; 4,693,113; 4,712,071; 4,735,101.

Fluid control valves are used in a wide variety of applications such as oil and gas pipelines and processing lines, as well as to control water and other fluids in nuclear power generating stations. In such critical applications, substantial maintenance is required, both of the periodic preventative maintenance type as well as to repair valve breakdowns in order to assure that the control valve performs properly, thereby reducing losses associated with process fluid leakage and trim damage. It has been desired therefor to provide an easy and readily available technique for diagnostically checking such fluid control valves already installed in the system so that operational problems can be detected before they become the source of fluid process losses or, in the worse case, cause unscheduled shutdowns of the processing system.

A motor operated valve analysis and testing system is described in the above-mentioned patents for fluid control valves operated by a very specific type of electric actuator including a motor moving the valve stem through a worm gear, and a cluster of compression springs termed a "spring pack" for reacting to valve stem thrust. Spring pack movement is detected to provide an indirect indication of stem load. However this first requires that a calibration be done where the stem load is measured using a load cell and the readings correlated to spring pack movement. The load cell is then removed and the spring pack reading used to measure stem load during operation. Motor current is also measured and is correlated to stem load to give an indication of the overall condition of the motor. This prior art system is time consuming and cumbersome in requiring the initial calibrations as well as requiring a significant amount of time to install and remove the load cell on each actuator to be tested.

Furthermore, many fluid control valves, such as pneumatically actuated control valves do not have a motor or spring pack so that the valve measurements described earlier in connection with electrically actuated valves does not apply to such pneumatic units. Accordingly, it is desired to provide an improved technique for diagnostically testing fluid control valves, such as pneumatically operated valves in a fast and efficient manner.

SUMMARY OF THE INVENTION

In accordance with the principles of the present invention, there is provided apparatus and a method for diagnostically testing fluid control valves, such as pneumatically actuated valves. The technique includes providing a pressure sensor to sense varying pressure at the input of the valve actuator and a position sensor to sense movement of the valve plug. The valve is then dynamically operated through a dynamic test operation cycle by supplying a controlled variable pneumatic pressure to the input of the pneumatic valve actuator forming a dynamic input to the valve. During the test operation cycle the valve plug is moved through a desired range, normally from a fully opened position to a fully closed position and returned from the fully closed position to the fully opened position.

During the test operation cycle, the pressure sensor provides an output signal which corresponds to varying pressure at the valve actuator input indicating the dynamic input to the valve, and the position sensor provides an output signal corresponding to movement of the valve plug conforming to the dynamic output of the valve. The respective output signals of air pressure at the actuator and of valve plug or valve stem position are then processed to derive data representing the variation in pressure at the valve actuator input as a function of movement of the valve plug during the test operation cycle thereby providing a dynamic diagnostic testing of the valve. The valve stem load is derived by multiplying pressure times the effective area of the actuator diaphragm. Since the effective area is a known quantity, no calibration cycle is required to determine valve stem load as in the prior art.

Therefore a significant advantage of the present invention is the ability to immediately plot valve stem load versus valve position and display the plot such as on a visual display and/or a printer so that one can ascertain certain valve problems, such as valve sticking or intermittent hesitation caused by excessive friction, etc. Analysis of the plot of stem load versus valve p travel provides several important pieces of information on the valve condition, namely:

1. A determination of valve packing, seal, and bearing friction. Excessive friction levels can affect actuator operation. Friction values that are too low may indicate insufficient load on the packing since packing friction is normally the largest of its three constituents;

2. Determine the valve spring constant and spring adjustment to thereby check for an incorrect or damaged spring and to determine whether the spring "benchset" has been properly adjusted;

3. Determine the valve seat load by determining the pressure at which the plug contacts the seat and comparing it to the final pressure; and 4. Determining that the valve plug is contacting the seat on the closing stroke.

A diagnostic check of the valve actuator can also be made with the present invention. In a conventional pneumatic operated valve, a current to pressure (I/P) transducer is coupled to a valve positioner which supplies an operating pneumatic pressure to the valve diaphragm actuator which in turn is coupled to a sliding valve stem and plug. A feedback is provided by a valve positioner arm having one end connected to the actuator/valve stem and the other end coupled to the positioner so as to track movement of the valve stem. Normally a 4-20 mA signal controls the valve operation.

The present invention includes providing a control signal to the I/P transducer to operate the valve over a test operation cycle, while taking measurements of the respective inputs and outputs of the I/P transducer and the valve positioner. Therefore, during the test operation cycle wherein the valve is stroked through its test cycle, the present apparatus provides a calibration check on the valve positioner and the I/P transducer. In addition, utilizing the above input information, the present system can verify valve stroke, actual stroking time, and pneumatic supply pressure.

BRIEF DESCRIPTION OF THE DRAWINGS

The features of this invention are set forth with particularity in the appended claims. The invention may be best understood by reference to the following description taken in conjunction with the accompanying drawings, in which like reference numerals identify like elements in the several figures and in which:

FIG. 1 is a schematic diagram of a fluid control valve and actuator assembly for a sliding stem valve to illustrate the moving parts that cause flow changes through the valve;

FIG. 2 is a schematic diagram illustrating a fluid control valve and actuator assembly and diagnostic valve testing apparatus in accordance with the present invention;

FIG. 3 is a block diagram illustrating the diagnostic valve controller components and the flow of input and output information in accordance with the present invention.

DETAILED DESCRIPTION

Figure 4:
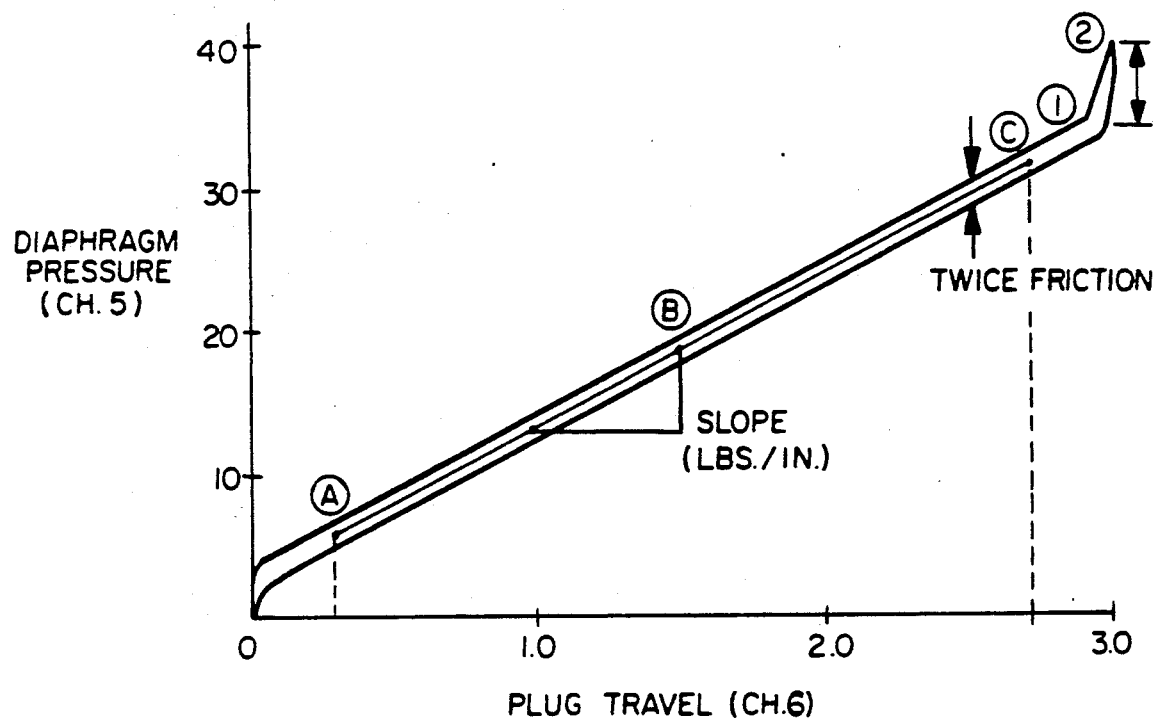
FIGS. 4-8 are graphic plots derived from the diagnostic controller output information and which plots are helpful in evaluating the valve and actuator condition.

A very large variety of control valve and actuator combinations are commercially available. Such commercially available valve types include sliding stem, rotary ball, rotary plug, butterfly, and eccentric disk. The actuator can be spring and diaphragm, spring and piston, double acting piston, hydraulic, electrohydraulic, or electric, mounted on either a rotary or sliding stem valve. The present invention is particularly useful for fluid control valves using a pneumatically operated actuator with either diaphragms or pistons as their primary source of power. For purposes of illustrating the principles of the present invention, a spring and diaphragm actuator on a sliding stem valve is described hereinafter. It is to be understood however that the principles of this invention can also be adapted for use on a rotary valve.

FIG. 2 illustrates a fluid control valve and actuator assembly 10 schematically illustrated so that the force interactions can be better understood. The valve and actuator assembly 10 shown in FIG. 2 is known as a spring to open, flow-down, balanced construction and is one of the more common versions commercially available and used, however it is understood that the present invention can be applied equally well with other pneumatically operated versions.

Valve 10 includes diaphragm plate 12, actuator stem 14 and a valve plug/stem assembly including valve stem 16 and plug 18. A stem connector 20 connects actuator stem 14 to valve stem 16. Spring 22 normally exerts sufficient pressure upwardly on diaphragm 12 to lift the valve plug and stem assembly so that the valve is in the open position.

Referring now to FIG. 1, there is illustrated a simplified free body diagram of the valve and actuator with schematic representations of diaphragm 12, actuator stem 14, valve stem 16, plug 18 and connector 20. The illustrated components are the moving parts that cause changes in fluid flow through the valve. The respective forces labeled "F" and illustrated in FIG. 1 adjacent to a respective directional arrow are defined in the following Table 1.

TABLE 1

DEFINITION OF FORCES

| Force Symbol | Description |
| --- | --- |
| Fa | The product of the air pressure in the actuator and the effective area of the diaphragm. The effective area changes with valve plug travel, and this change is taken into account in the system's calculations. |
| Fp | The spring load acting against Fa, and expressed as $Fp = Fi + T(K)$. |
| Fi | Initial spring pre-load with the valve wide open. This is a function of the valve benchset, or in other words, the initial spring adjustment. |
| T | Valve plug travel with zero as the wide-open position. |
| K | Spring constant. |
| Fb | The actuator bearing friction force, which always acts in the direction opposite to stem movement. |
| Ff | Packing friction, especially important with graphite or asbestos-type packing where improper packing adjustment can result in relatively large variations in packing friction. |
| FU1 | The stem unbalance caused by the internal pressure acting on the unbalance area of the stem. |
| Fs | The friction force between the seal and the I.D. of the cage. This changes as a function of the type and diameter of the seal. |
| FL | The seat load between the plug and seat ring. This is critical in determining the shut-off capabilities of the valve in question. |
| FU2 | The pressure unbalance on the plug. It can be in either direction depending on whether the valve is flow-up or flow-down. In any case, in a balanced design it is very small. |

A general force balance on the parts, as shown in FIG. 1, results in the following equation:

$$Fa = Fp \pm (Fb) \pm (Ff) + FU2 \pm (Fs) + FL + FU2 \quad (1)$$

Applying the equation for the case where the valve is closing and ignoring the relatively small plug imbalance, yields the following:

$$Fa = Fp + Fb + Ff + FU1 + Fs + FL \quad (2)$$

Note that Fb, Ff and Fs are all friction forces and that Ff (Packing Friction) can vary considerably. If spring force is subtracted from Fa, it yields the net force available in the actuator stem to overcome the three friction forces and the pressure unbalance on the stem, and provide for sufficient seat load to limit through-leakage to acceptable levels. Simplifying Equation 2 yields:

$$(Fa - Fp) = Fn \text{ (net force)} = Ffr + FU1 + FL. \quad (3)$$

where $Ffr = Fb + Ff + Fs$

Examination of Equation 3 yields some interesting information. To successfully perform its duties, an actuator must be able to fully stroke the valve (usually with some velocity requirement) and load the seat to provide for proper shut-off. To fully stroke the valve, the net force available throughout the valve stroke must be slightly greater than (Ffr + FU1) or the stem won't move. The difference between Fn and (Ffr + FU1) together with the flow rate of the air supply, determines the velocity of stem movement In addition, the actuator must apply FL to provide a seat load sufficient to assure shut-off in the closed position. This means that even though the net force available agrees with the original actuator sizing calculations, if one of the frictional forces of FU1 is too great, it would reduce the seat load and could even affect the ability of the valve to achieve full stroke. In equation form that is expressed as follows:

$$Fn > (Ffr + FU1) + FL \quad (4)$$

With Fn constant, any increase in (Ffr + FU1) must result in a decrease in FL (seat load). Reduced seat load causes unnecessary leakage with a resultant drop in process efficiency and possible trim damage.

In the same way, if Fn is too low even though (Ffr + FU1) is correct, the same problem results. Fn can be reduced if there is an insufficient air supply, or a spring that is adjusted too tightly or that has the wrong spring rate.

To avoid these problems and assure that the actuator/valve assembly will properly perform, requires a verification of the forces shown in Equation 3. The apparatus and method of the present invention described hereinafter with respect to FIGS. 2–8 provides a valve diagnostic check-up in a very fast and reliable dynamic test operation cycle under a controlled variable test input, i.e., a dynamic input. Several other useful diagnostic results are also obtained.

Referring now to FIG. 2, there is illustrated a diagnostic controller 30 which provides a 0–30 mA signal output on channel 1 in either a programmed ramp or step change form to stroke or dynamically operate valve assembly 10 over a predetermined range and thereby provide respective sensor output signals on channels 2, 3, 4, 5, 6 to diagnostic controller 30. Information to be entered into controller 30 can be provided by keyboard 32 and the output information from controller 30 can be coupled to a CRT display 34 as well as to a printer 36.

Valve assembly 10 includes valve body 38 having valve plug 18 connected to valve stem 16 and in turn connected through stem connector 20 to actuator stem 14. Actuator stem 14 is in turn connected to diaphragm plate 12 which is mounted within a spring barrel 40 by means of flexible diaphragm 42 to control the flow of fluid between the inlet and outlet ports 43,45 of valve body 38. Spring 22 normally biases plate 12 upwardly so that in the sliding stem valve illustrated in FIG. 2, valve plug 18 is pulled up away from the valve seat so as to open the valve.

Actuation of the valve is provided by standard components including a current to pressure transducer 42 and a positioner 44 for supplying a controlled variable operating pressure, i.e. a dynamic input, at valve actuator input line 46. Such a typical configuration includes a supply of pressurized air on pneumatic line 48 which is split and fed through respective pneumatic lines through respective valves to the current to pressure (I/P) transducer as well as to valve positioner 44. Thus, input pneumatic line 50 to transducer 42 and input pneumatic line 52 to the valve positioner are each at the pneumatic supply pressure.

Normally, the signal input for controlling valve assembly 10 consists of a 4–20 mA signal on transducer input line 53 which will provide a corresponding output pressure of about 3–15 psi (0.21–1.06 kscm) on line 54 which is supplied to the controlled input of positioner 44. The output pressure of positioner 44 is supplied on line 56 to actuator pressure input line 46 in order to operate valve 10. A booster relay 58 may be provided when desired to increase the air volume. Booster relay 58 includes an input of supply line pressure on input line 60 to aid in proper operation of the valve actuator by positioner 44 under certain conditions. Valve positioner 44 also includes valve positioner arm 6 connected at one end to the actuator stem and at the other end within positioner 44 to provide valve position registration and thereby to insure that positioner 44 moves plug 18 the desired amount in response to changes in the input current to (I/P) transducer 42.

Accordingly, under ordinary operations of valve assembly 10, with about a 4 mA signal input to transducer 42, the transducer provides about a 3 psi (0.21 kscm) input to positioner 44, which in turn provides a corresponding pressure on actuator input line 46 which is not sufficient to overcome the upward bias force of spring 22 and the valve is therefore in the fully opened position. When the control current signal is raised to about 20 mA, transducer 42 provides about 15 psi (1.06 kscm) to positioner 44, which in turn provides a corresponding pressure input via line 46 to counteract spring 22 and thereby slide valve stem 16 downwardly so as to seat valve plug 18 and thereby close the valve. Obviously, various valve positions in between the fully opened and fully closed position are obtained by variations in the input 4–20 mA current signal to transducer 42.

In order to provide diagnostic evaluation of valve 10 in terms of the valve characteristics previously described, a suitable output signal from diagnostic controller 30 is provided on current signal output channel 1 to transducer 42. As an example, a 0 to 30 mA signal on channel 1, providing a dynamic input to the valve is sufficient to insure that the valve is stroked through its fully opened and fully closed positions. Less than the full range of valve operation may also be provided. Pressure sensors 70, 72, 74 and 76 are temporarily mounted to sense the pneumatic pressure on the illustrated respective pneumatic lines and provide an electric output signal on respective input channels 2, 3, 4 and 5 to the diagnostic controller. Such pressure sensors are well known, commercially available items. If booster relay 58 is not present then sensor 74 is not needed.

A position sensor 78 is suitably temporarily removably mounted in the valve assembly to detect the linear positional movement of valve positioner arm 60 which corresponds to movement of valve plug 18. Position sensor 78 provides a corresponding electric output signal which is supplied to channel 6 of controller 30. Position sensor 78 is a commercially available device such as a digital linear gauge, manufactured by Nititoyo Company of Japan utilizing a light source and an etched glass light sensor to provide a signal on channel 6 in response to linear movement of the valve plug.

Thus, as valve assembly 10 is stroked through its test operating cycle by means of its control current signal on channel 1, a respective pressure is being sensed and the corresponding electric signals are fed to channels 2, 3, 4 and 5, and simultaneously the valve plug position and travel distance are being sensed and the corresponding electric signal is supplied on channel 6. The usefulness of obtaining such pressure and valve plug position information can be seen with reference to the following Table 2.

TABLE 2

INPUT DESCRIPTIONS

| Channel Number | Descriptions |
| --- | --- |
| 2 | Supply Pressure to the Positioner. By monitoring this pressure, the user can verify that supply pressure is sufficient to provide full valve stroke and seat load. He can also check for pressure decay during the stroke, which can slow actuator operation that is sometimes caused by restrictions in the supply pressure line. |
| 3 | Signal to the Positioner. This can be used to check proper I/P transducer calibration when compared with channel 1 during valve stroke, since channel 2 is the input and channel 3 is the output. At the same time, a second display can be generated showing the relationship between channel 3 and channel 5, permitting the user to verify positioner calibration. |
| 4 | Signal to Booster relay - when present, checks booster input against booster output (channel 5) for proper operation. |
| 5 | Air-to-Diaphragm Signal. This is one of the key parameters that, when compared to channel 6 (valve position or travel), provides the force equation verification described with reference to equation (3). |
| 6 | Valve Position or Travel. The second half of the force equation verification related to positional movement of the valve plug. |

FIG. 3 illustrates the components of diagnostic controller 30 which supply the 0–30 mA control signal on channel 1 to control valve assembly 10 and receive the pressure related signals on channels, 2 3, 4, 5 and the valve travel distance information on channel 6. The pressure related signals are coupled through a bank of amplifiers 80, multiplexer 82, analog/digital converter 84 to microprocessor 86. The valve travel information on channel 6 is coupled to a counter 88 and then into microprocessor 86. A digital/analog converter 90 converts the digital output of microprocessor 86 into the required analog control signal for channel 1. Providing suitable microprocessor program instructions for controlling the acquisition of data and developing graphic output plots is well within the skills of an ordinary programmer in the art. A program for microprocessor 86 is presented in Appendix A.

Keypad 92 and liquid crystal display 96 are provided for inputting and outputting information to the microprocessor. Suitable disc drive 97 and power supply components 98 are provided.

Thus, as the valve assembly is stroked through its operating cycle, the corresponding pressure and valve travel information on channels 2 through 6 are obtained by microprocessor 86 and can be displayed immediately, or stored for later processing and display in graphical form for suitable analysis of the valve parameters. For example, the graphical plot of FIG. 4 can be provided from information derived from channel 5 and channel 6. FIG. 4 illustrates the change in diaphragm pressure, i.e. the pressure at input line 46 as sensed by pressure sensor 76 as a function of the valve travel sensed by position sensor 78 and which information is supplied on channel 6 as the valve is stroked from a fully open position near point A at the left-hand side of FIG. 4 to a fully closed position at the right-hand side of FIG. 4 near point C and then returned to a fully open position illustrated at the left-hand side of FIG. 4 near A. FIG. 4 allows the following valve parameters to be examined:

(1) Packing Seal and Bearing Friction—Since friction acts in both valve operating directions, the friction valve can be determined by measuring the vertical width of the band (between the reference arrows labelled "Twice Friction"), dividing by two, and multiplying by the effective area of the diaphragm. The system will automatically calculate this quantity and compare it to normal levels stored in the diagnostic controller for the valve in question. Excessive friction levels can affect actuator operation as described earlier. Friction values that are too low may indicate insufficient load on the packing since packing friction is normally the largest of the three friction constituents.

(2) Benchset (Spring Adjustment and Spring Constant)—The spring constant can be determined by computing the average slope of the curves from points A to C representing 10% to 90% of travel, and converting to force/distance units by using the effective diaphragm area. Spring adjustment is checked by examining the loads at 10% to 90% of travel. Both the spring constant and adjustment can then be compared to normal values.

(3) Seat Load—Seat load is determined by measuring the pressure difference between points 1 and 2 on the curve. Point 1 is where the valve plug first contacts the seat, and is accompanied by a very radical change in slope. Point 2 is the maximum pressure on the diaphragm where the valve plug is fully seated. Multiplying this pressure difference times the effective area of the diaphragm yields the seat load in force units, which can be compared to acceptable levels given valve size and service conditions.

Figure 5:
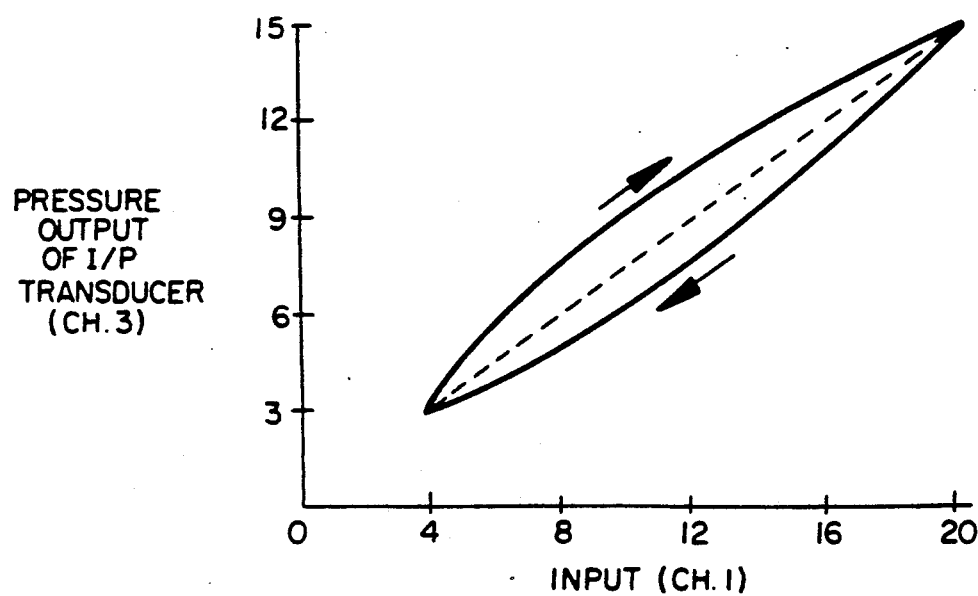
Figure 6:
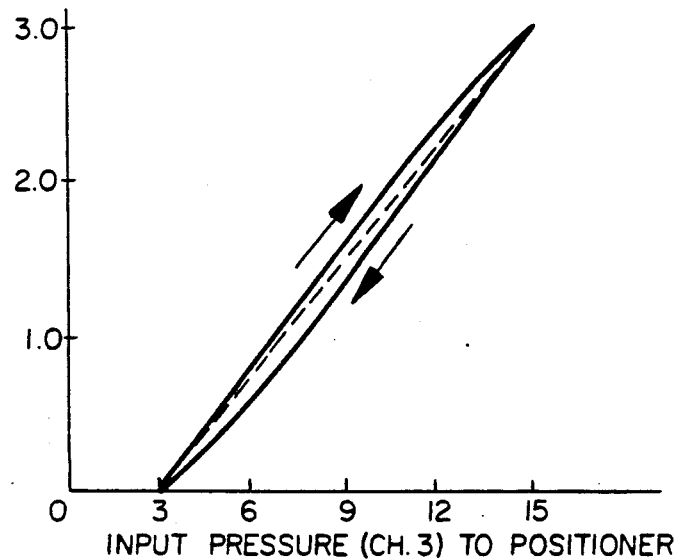

Additional graphic plots utilizing the sensed valve parameter information can be prepared as illustrated in FIGS. 5 through 8. FIG. 5 is a plot of the output pressure derived on channel 3 as a function of the input control current on channel 1 as the valve is stroked through a test operation cycle from open to close and returned to open. FIG. 5 can be used to generate a deviation cycle thereby providing a complete picture of transducer 42 operation, including characteristics of linearity, hysteresis and range. The same type of calibration information for valve positioner 44 can be developed from FIG. 6. FIG. 6 represents the plot of information derived from valve plug movement or travel on channel 6 as a function of input pressure on channel 3 during the valve test operation cycle.

Figure 7:
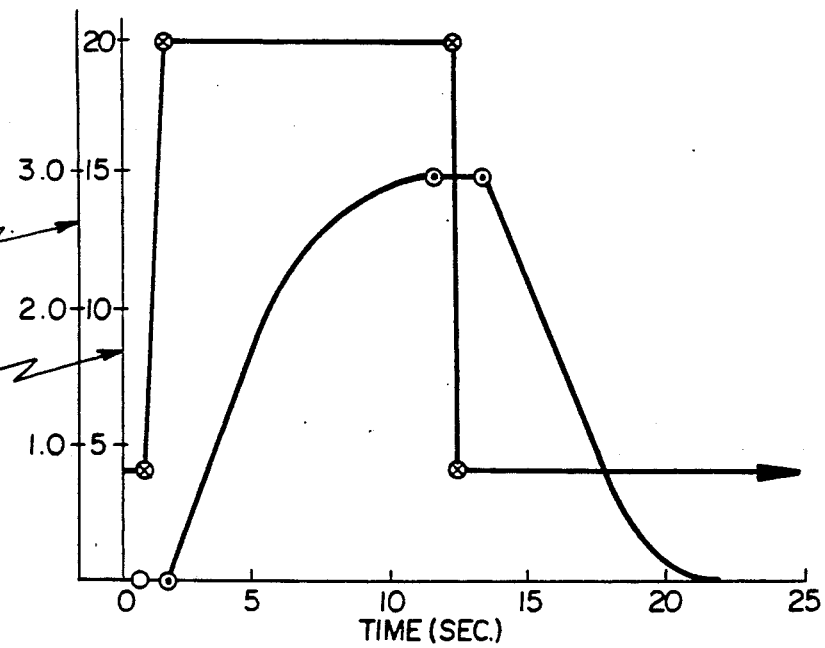
Figure 8:
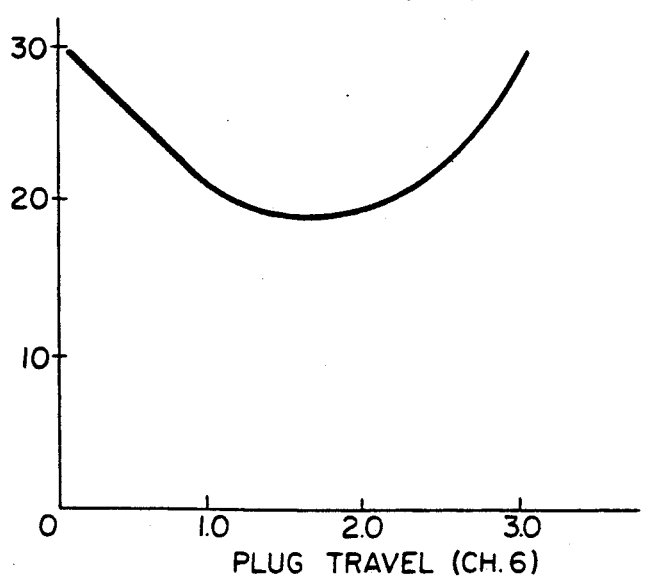

FIG. 7 represents the valve travel information on channel 6 and also the input current signal on channel 1 (either ramp, step-change or on-off) as a function of time. FIG. 7 allows one to verify the amount of valve travel and the stroking speed during operation, thereby dynamically testing whether the valve is operating within frictional limits, etc. FIG. 8 is a plot of the supply pressure on channel 2 as a function of the valve distance on channel 6 during the valve test operation cycle. An evaluation of the plot of FIG. 8 can be made so that the effect of supply pressure on valve stroking time can be evaluated.

Accordingly, the valve diagnostic information provided in accordance with the present information and as illustrated for instance in FIGS. 4-8, enable those skilled in the art to very quickly determine where any valve problems occur and to take appropriate action to remedy such problems before they cause extensive valve damage or, in the worse case, a forced system shutdown. Extensive use of the present invention in a fluid control system as part of a preventative maintenance program should greatly reduce the expenditures associated with valve maintenance as well as improve system reliability and availability.

It is to be understood that the valve test operation cycle can be run from the open to the closed and again to the open position or vice versa. In addition, less than all of the test operation cycle may be run in accordance with the present invention in order to provide useful valve output diagnostic information. As an example, in FIG. 4, valuable seat load information is determined between points 1 and 2 on the illustrated curve and the valve need only be stroked in order to encompass these two points. Therefore either a partial or a full cycle may be utilized.

In additional, while the illustrated embodiment of this invention is in connection with sliding stem valves, it is to be understood that the same principles apply as well to other types of valves such as rotary discs or balls. Similarly, rather than detecting the position and thereby the valve travel by detecting the movement of positioner arm 60, or of valve stem 16 or of actuator stem 14, the movement of any other part associated with the movement of valve plug 18 can be utilized. As an example, one could, if desired, detect linear movement of diaphragm plate 12 since the plate is integrally connected to and therefore moves integrally with valve plug 18. Sensors 70, 72, 74, 76 can be located in diagnostic controller 30 and connected to the respective pneumatic lines through suitable air lines if desired.

The foregoing detailed description has been given for clearness of understanding only, and no unnecessary limitations should be understood therefrom, as modifications will be obvious to those skilled in the art.

```
                              APPENDIX A
       {----------------------------------------------------------------}
       {                                                                }
       {               (   TESTING3.PAS          )                      }
       {               (   Roy J. Groalith       )                      }
       {               (   10/18/88 e.v.         )                      }
       {                                                                }
       {----------------------------------------------------------------}

PROGRAM Testing3;

USES DOS, CRT, GRAPH;                    (C) 1988 Fisher Controls
                                                    International, Inc.
       TYPE
            stroke_data = RECORD
                          current, pres1, pres2, pres3, pres4, dsplcmnt : INTEGER;
                          END;

valve_info = RECORD
                          test_name        : STRING[15];
                          test_date        : STRING[15];
                          test_time        : STRING[15];
                          test_type        : STRING[15];
                          test_window      : STRING[15];
                          serial_num       : STRING[15];
                          tag_num          : STRING[15];
                          body_style       : STRING[20];
                          body_size        : STRING[10];
                          trim_style       : STRING[20];
                          trim_size        : STRING[10];
                          flow_direction   : STRING[7];
                          push_down        : STRING[7];
                          balance          : STRING[7];
                          inlet_psig       : STRING[7];
                          outlet_psig      : STRING[7];
                          stem_size        : STRING[7];
                          actuator_style   : STRING[7];
                          actuator_size    : STRING[7];
                          leak_class       : STRING[7];
                          seat_type        : STRING[15];
                          packing_type     : STRING[7];
                          valve_travel     : STRING[7];
                          acsry_1          : STRING[31];
                          acsry_2          : STRING[31];
                          acsry_3          : STRING[31];
                          acsry_4          : STRING[31];
                          acsry_5          : STRING[31];
                          comment          : STRING[71];
                          END;
```

```
 47
 48
 49              CONST
 50                  io_A    = $384;
 51                  io_B    = $385;
 52                  io_C    = $386;
 53                  io_ctrl = $387;
 54                  lcd_rg  = $10;
 55                  lcd_dt  = $00;
 56                  lcd_rd  = $20;
 57                  lcd_wr  = $80;
 58                  lcd_en  = $40;
 59                  lcd_ds  = $00;
 60                  lcd_ncs = $00;
 61                  lcd_cs  = $00;
 62
 63              {----------------------------------------------------------------}
 64
 65              ----------------------------------------------------------------}
 66              VAR
 67                  up_rec                        : ARRAY[0..4999] OF stroke_data ABSOLUTE $7C00:$0000;
 68                  down_rec                      : ARRAY[0..4999] OF stroke_data ABSOLUTE $8AA6:$0000;
 69                  tag_form                      : valve_info;
 70                  GraphDriver, GraphMode        : INTEGER;
 71                  a1, b1, b2, c1, l1            : WORD;
 72                  fix_time, r1                  : WORD;
 73                  first_byte, new_data          : BOOLEAN;
 74                  graph_it                      : BOOLEAN;
 75                  valve_up, valve_down          : BOOLEAN;
 76                  year, month, day, dayofweek   : WORD;
 77                  hour, minute, second, sec100  : WORD;
 78                  date_s, time_s                : STRING[8];
 79                  base, porta, portb, portc     : INTEGER;
 80                  pcntrl                        : INTEGER;
 81                  displacement                  : REAL;
 82                  volt_out, shift_volt          : INTEGER;
 83                  cntr_val                      : INTEGER;
 84                  dtoa_l, dtoa_h, atod          : INTEGER;
 85                  cnter_l, cnter_h              : INTEGER;
 86                  rst_ctr, rst_key              : INTEGER;
 87                  test_d1, test_d2, mux_adr     : BYTE;
 88                  key_num                       : BYTE;
 89                  finished                      : BOOLEAN;
 90                  a_d_value                     : INTEGER;
 91                  message                       : STRING[32];
 92                  xc1                           : CHAR;
 93                  t1                            : BYTE ABSOLUTE xc1;
 94                  binary_image                  : FILE;
 95                  file_name, file_name_config   : STRING[12];
 96                  file_name_up, file_name_down  : STRING[12];
 97                  time_delay, dat_pnt           : INTEGER;
 98                  yes, no                       : BOOLEAN;
 99              {----------------------------------------------------------------}
100
101              ----------------------------------------------------------------}
102              PROCEDURE beep( number: BYTE );
103                  BEGIN
104                      REPEAT
105                          Sound(666);
106                          DELAY(33);
107                          NoSound;
108                          DELAY(33);
109                          DEC(number);
110                      UNTIL (number=0);
111                  END;
112              {----------------------------------------------------------------}
113              PROCEDURE initialize;
114                  BEGIN
115                      beep(5);
116                      base    := $380;
117                      atod    := base + 0;  { Input / Output  A/D DATA    }
118                      porta   := base + 4;  { Input           KEY DATA    }
119                      portb   := base + 5;  { Output          LCD DATA    }
120                      portc   := base + 6;  { Output          LCD CONTROL }
121                      pcntrl  := base + 7;  { Output          8255 Mode   }
```

```
122             dtoa_l    := base + 8;    ( Output    D/A DATA  low  )
123             dtoa_h    := base + 9;    ( Output    D/A DATA  high )
124             cnter_l   := base + $C;   ( Input     COUNTER DATA L )
125             cnter_h   := base + $D;   ( Input     COUNTER DATA H )
126             rst_key   := base + $C;   ( Output    reset key status)
127             rst_ctr   := base + $D;   ( Output    reset counter  )
128             PORT[dtoa_h] := 0;
129             PORT[dtoa_l] := 0;
130             PORT[pcntrl] := $9B;    ( A = INPUT, B & C = OUTPUT   )
131             PORT[portc]  := $80;    ( init MUX, LCD drive, counter )
132             FillChar( up_rec, $F000, $00);
133             FillChar(down_rec, $F000, $00);
134             time_delay := 2;
135             IF (time_delay=0) THEN fix_time:=36 ELSE fix_time:=30;
136         END;
137     {----------------------------------------------------------------}
138
139     {----------------------------------------------------------------}
140     PROCEDURE write_register( reg_num, data : BYTE );
141         BEGIN
142             PORT[io_B] := reg_num;
143             PORT[io_C] := lcd_rg + lcd_cs  + lcd_wr + lcd_ds;
144             PORT[io_C] := lcd_rg + lcd_cs  + lcd_wr + lcd_en;
145             PORT[io_C] := lcd_rg + lcd_cs  + lcd_wr + lcd_ds;
146             PORT[io_B] := data;
147             PORT[io_C] := lcd_dt + lcd_cs  + lcd_wr + lcd_ds;
148             PORT[io_C] := lcd_dt + lcd_cs  + lcd_wr + lcd_en;
149             PORT[io_C] := lcd_dt + lcd_cs  + lcd_wr + lcd_ds;
150         END;
151     {----------------------------------------------------------------}
152     PROCEDURE write_data( data : BYTE );
153         BEGIN
154             PORT[io_B] := data;
155             PORT[io_C] := lcd_dt + lcd_cs  + lcd_wr + lcd_ds;
156             PORT[io_C] := lcd_dt + lcd_cs  + lcd_wr + lcd_en;
157             PORT[io_C] := lcd_dt + lcd_cs  + lcd_wr + lcd_ds;
158         END;
159     {----------------------------------------------------------------}
160     PROCEDURE Write_XY_LCD( d1, b1 : INTEGER );
161         BEGIN
162             write_register( $8A, d1 + (b1&$20) MOD $100 ); { set cursor address low }
163             write_register( $8B, (b1 DIV 8));              { set cursor address high}
164             write_register( $8C, 0 );                      { write display data byte}
165             FOR a1:= 1 TO LENGTH(message) DO
166                 BEGIN
167                     xc1 := message[a1];
168                     write_data(t1);
169                 END;
170         END;
171     {----------------------------------------------------------------}
172     PROCEDURE zero_counter;
173         BEGIN
174             PORT[rst_ctr] := 0;
175         END;
176     {----------------------------------------------------------------}
177     PROCEDURE read_counter;
178         BEGIN
179             cntr_val := PORTW[cnter_l] ;
180         END;
181     {----------------------------------------------------------------}
182     PROCEDURE read_a_d( mux_adr : BYTE );
183         BEGIN
184             PORT[portc] := $80 + mux_adr;                  { selects channel }
185             PORT[atod]  := 0;                              { start conversion }
186             REPEAT
187                 test_d1 := PORT[porta] AND $80;            { watching busy bit }
188             UNTIL (test_d1=0);
189             test_d2 := PORT[atod] AND $1F;                 { HIGH byte }
190             test_d1 := PORT[atod];                         { LOW byte }
191             a_d_value:= (test_d2 SHL 8) + test_d1;
192             IF ((test_d2 AND $10)=$10) THEN a_d_value:=a_d_value-8192;
193         END;
194     {----------------------------------------------------------------}
195
```

```
196     {------------------------------------------------------------------}
197     PROCEDURE waste_time;
198     BEGIN
199         r1 := fix_time;
200         REPEAT
201             DEC(r1);
202         UNTIL (r1=0);
203     END;
204     {------------------------------------------------------------------}
205     PROCEDURE ramp_to_energized_state;
206     BEGIN
207         dat_pnt := 0;
208         volt_out := 0;
209         REPEAT
210             PORT[$38C] := $00;
211             PORT[dtoa_h] := HI(volt_out SHL 4); { Bit 4 to bit 11 must go first }
212             PORT[dtoa_l] := LO(volt_out SHL 4); { followed by bit 0 to bit 3   .}
213             waste_time;
214             DELAY(time_delay);
215             down_rec[dat_pnt].current := volt_out;
216             read_a_d(0);
217             down_rec[dat_pnt].pres1 := a_d_value;
218             read_a_d(1);
219             down_rec[dat_pnt].pres2 := a_d_value;
220             read_a_d(2);
221             down_rec[dat_pnt].pres3 := a_d_value;
222             read_a_d(3);
223             down_rec[dat_pnt].pres4 := a_d_value;
224             read_counter;
225             down_rec[dat_pnt].dsplcmnt := cntr_val;
226             IF (volt_out<4095) THEN INC( volt_out );
227             INC( dat_pnt );
228         UNTIL (dat_pnt=5000);
229         beep(2);
230     END;
231     {------------------------------------------------------------------}
232     PROCEDURE ramp_to_rest_state;
233     BEGIN
234         dat_pnt := 4999;
235         volt_out := 4095;
236         REPEAT
237             PORT[$38C] := $00;
238             PORT[dtoa_h] := HI(volt_out SHL 4); { Bit 4 to bit 11 must go first }
239             PORT[dtoa_l] := LO(volt_out SHL 4); { followed by bit 0 to bit 3   .}
240             waste_time;
241             DELAY(time_delay);
242             up_rec[dat_pnt].current := volt_out;
243             read_a_d(0);
244             up_rec[dat_pnt].pres1 := a_d_value;
245             read_a_d(1);
246             up_rec[dat_pnt].pres2 := a_d_value;
247             read_a_d(2);
248             up_rec[dat_pnt].pres3 := a_d_value;
249             read_a_d(3);
250             up_rec[dat_pnt].pres4 := a_d_value;
251             read_counter;
252             up_rec[dat_pnt].dsplcmnt := cntr_val;
253             IF (volt_out>0) THEN DEC( volt_out );
254             DEC( dat_pnt );
255         UNTIL (dat_pnt=-1);
256         beep(2);
257     END;
258     {------------------------------------------------------------------}
259
260     {------------------------------------------------------------------}
261     FUNCTION reverse( a : BYTE ) : BYTE;
262     VAR
263         work : BYTE;
```

```
264             BEGIN
265                work := 0;
266                IF ((a AND $01)=$01) THEN INC(work, $80);
267                IF ((a AND $02)=$02) THEN INC(work, $40);
268                IF ((a AND $04)=$04) THEN INC(work, $20);
269                IF ((a AND $08)=$08) THEN INC(work, $10);
270                IF ((a AND $10)=$10) THEN INC(work, $08);
271                IF ((a AND $20)=$20) THEN INC(work, $04);
272                IF ((a AND $40)=$40) THEN INC(work, $02);
273                IF ((a AND $80)=$80) THEN INC(work, $01);
274                reverse := work;
275             END;
276       {------------------------------------------------------------------}
277       PROCEDURE ClearLCDAlpha;
278          BEGIN
279             PORT[io_ctrl] := $90;
280             write_register( $00, $30 );        { mode control byte - alphanum }
281             write_register( $01, $7F );        { # of dots on vertical        }
282             write_register( $02, $1F );        { # of bytes on horizontal     }
283             write_register( $03, $3F );        { time division value 1/64    }
284             write_register( $04, $00 );        { cursor position - bottom line}
285             write_register( $08, $00 );        { display start address LOW   }
286             write_register( $09, $00 );        { display start address HIGH  }
287             write_register( $0A, $00 );        { set cursor address LOW      }
288             write_register( $0B, $00 );        { set cursor address HIGH     }
289             write_register( $0C, 0 );          { write 1st display data byte }
290             FOR b1:= 0 TO 510 DO
291                BEGIN
292                   write_data( $00 );
293                END;
294          END;
295       {------------------------------------------------------------------}
296
297       {------------------------------------------------------------------}
298       PROCEDURE copy_crt_lcd;
299          BEGIN
300             PORT[io_C]   := $00;
301             PORT[io_ctrl] := $90;
302
303             write_register( $00, $32 );        { mode control data - graphics }
304             write_register( $01, $7F );        { # of dots on vertical        }
305             write_register( $02, $1F );        { # of bytes on horizontal     }
306             write_register( $03, $3F );        { time division value - 1/64   }
307             write_register( $08, $00 );        { display start address LOW    }
308             write_register( $09, $00 );        { display start address HIGH   }
309             write_register( $0A, $00 );        { cursor start address LOW     }
310             write_register( $0B, $00 );        { cursor start address HIGH    }
311
312             first_byte := TRUE;
313             FOR l1:= 110 TO 237 DO             { write the rest of data bytes }
314                BEGIN
315                   FOR c1:= 29 TO 60 DO
316                      BEGIN
317                         b2 := ((l1 MOD 4)*$2000)+((l1 DIV 4)*$5A)+c1;
318                         a1 := reverse(MEM[$B000:b2]);
319                         IF (first_byte) THEN
320                            BEGIN write_register( $0C, a1); first_byte:=FALSE; END
321                         ELSE write_data( a1 );
322                      END;
323                END;
324             beep(1);
325          END;
326       {------------------------------------------------------------------}
327       PROCEDURE clear_center_graphics;
328          BEGIN
329             first_byte := TRUE;
330             FOR l1:= 160 TO 190 DO             { write the rest of data bytes }
331                BEGIN
332                   FOR c1:= 35 TO 60 DO
333                      BEGIN
334                         b2 := ((l1 MOD 4)*$2000)+((l1 DIV 4)*$5A)+c1;
335                         MEM[$B000:b2] := $00;;
336                      END;
337                END;
338          END;
```

```
339                    {--------------------------------------------------------------}
340
341                    {--------------------------------------------------------------}
342                    PROCEDURE create_menu_screens;
343                    BEGIN
344                        GraphDriver := HercMono;
345                        GraphMode := HercMonoHi;
346                        InitGraph( GraphDriver, GraphMode, '' );
347                        SetActivePage(1);
348                        SetVIsualPage(1);
349                        SetTextStyle( TriplexFont, HorizDir, 7 );
350                        Rectangle( 245, 115, 472, 168 );
351                        Rectangle( 244, 114, 473, 169 );
352                        Rectangle( 243, 113, 474, 170 );
353                        OutTextXY( 255, 108, 'FISHER' );
354                        OutTextXY( 256, 108, 'FISHER' );
355                        OutTextXY( 255, 107, 'FISHER' );
356                        OutTextXY( 256, 107, 'FISHER' );
357                        OutTextXY( 255, 165, 'Service' );
358                        OutTextXY( 256, 165, 'Service' );
359                        OutTextXY( 255, 166, 'Service' );
360                        OutTextXY( 256, 166, 'Service' );
361                        GetDate( year, month, day, dayofweek );
362                        GetTime( hour, minute, second, sec100 );
363                        copy_crt_lcd;
364                        beep(3);
365                        InitGraph( GraphDriver, GraphMode, '' );
366                        SetActivePage(1);
367                        SetVIsualPage(1);
368                        SetTextStyle( TriplexFont, HorizDir, 2 );
369                        Rectangle(235, 115, 313, 137 );
370                        Rectangle(234, 114, 314, 138 );
371                        OutTextXY( 240, 115, 'FISHER  Service - MENU' );
372                        OutTextXY( 240, 150, 'Stroke Valve Up & Down' );
373                        OutTextXY( 290, 180, 'Display Test Results' );
374                        OutTextXY( 280, 210, 'Calibrate the System' );
375                        copy_crt_lcd;
376                        beep(3);
377                        TextMode(mono);
378                    END;
379                    {--------------------------------------------------------------}
380
381                    {--------------------------------------------------------------}
382                    PROCEDURE dsply_xducr_cal;
383                    BEGIN
384                    END;
385                    {--------------------------------------------------------------}
386                    PROCEDURE dsply_trvl_prsr;
387                    BEGIN
388                    END;
389                    {--------------------------------------------------------------}
390
391                    {--------------------------------------------------------------}
392                    PROCEDURE text_status_report;
393                    BEGIN
394                    END;
395                    {--------------------------------------------------------------}
396                    PROCEDURE select_time_window;
397                    VAR
398                        screen_text : ARRAY[0..15] of STRING[30];
399                                s : STRING[15];
400
401                    BEGIN
402                        screen_text[0] := '                                ';
403                        screen_text[1] := 'FISHER Service                  ';
404                        screen_text[2] := '                                ';
405                        screen_text[3] := 'Select Time Window              ';
406                        screen_text[4] := '                                ';
407                        screen_text[5] := '1 =  10 Seconds ( 500 pps )     ';
408                        screen_text[6] := '                                ';
409                        screen_text[7] := '2 =  20 Seconds ( 250 pps )     ';
410                        screen_text[8] := '                                ';
411                        screen_text[9] := '3 =  50 Seconds ( 100 pps )     ';
412                        screen_text[10] := '                                ';
```

```
413                screen_text[11] := '4 = 100 Seconds ( 50 pps )    ';
414                screen_text[12] := '                                ';
415                screen_text[13] := '5 = 200 Seconds ( 25 pps )    ';
416                screen_text[14] := '                                ';
417                screen_text[15] := '6 = 500 Seconds ( 10 pps )    ';
418
419                ClearLCDAlpha;
420                FOR b1 := 1 TO 15 DO
421                    BEGIN
422                       message := screen_text[b1];    Write_XY_LCD( 0, b1 );
423                    END;
424
425                PORT[rst_key] := 0;
426                REPEAT
427                    test_d1 := PORT[porta];
428                    test_d2 := test_d1 AND $20;
429                UNTIL (test_d2=$20);
430                key_num := test_d1 AND $1F;
431                PORT[rst_key] := $80;
432                beep(1);
433                CASE key_num OF
434                    7 : BEGIN time_delay:=90; s:='500 Sec'; END; { 6 }
435                    6 : BEGIN time_delay:=30; s:='200 Sec'; END; { 5 }
436                    5 : BEGIN time_delay:=10; s:='100 Sec'; END; { 4 }
437                   11 : BEGIN time_delay:=8;  s:=' 50 Sec'; END; { 3 }
438                   10 : BEGIN time_delay:=2;  s:=' 20 Sec'; END; { 2 }
439                    9 : BEGIN time_delay:=0;  s:=' 10 Sec'; END; { 1 }
440                   19 : EXIT;
441                END;
442                IF (time_delay=0) THEN fix_time:=36 ELSE fix_time := 30;
443                tag_form.test_type   := 'Ramp Up/Down';
444                tag_form.test_window := s;
445
446                ClearLCDAlpha;
447                message := 'Time Window - '+ s;
448                Write_XY_LCD( 0, 3 );
449                beep(3);
450            END;
451       {----------------------------------------------------------------}
452
453       {----------------------------------------------------------------}
454       PROCEDURE keypad_yes_no;
455       BEGIN
456            InitGraph( GraphDriver, GraphMode, '' );
457            SetActivePage(1);
458            SetVisualPage(1);
459            SetTextStyle( TriplexFont, HorizDir, 2 );
460            OutTextXY( 229, 120, message );
461            OutTextXY( 259, 150, '          F2  = YES' );
462            OutTextXY( 259, 180, '          F3  = NO ' );
463            copy_crt_lcd;
464            beep(3);
465            yes := FALSE;
466            no  := FALSE;
467            PORT[rst_key] := 0;
468            REPEAT
469                test_d1 := PORT[porta];
470                test_d2 := test_d1 AND $20;
471            UNTIL (test_d2=$20);
472            key_num := test_d1 AND $1F;
473            beep(1);
474            CASE key_num OF
475                4 : yes := TRUE;
476                8 : no  := TRUE;
477            END;
478            PORT[rst_key] := 0;
479       END;
480       {----------------------------------------------------------------}
481
482       {----------------------------------------------------------------}
483       PROCEDURE select_disk_data;
484       VAR
485            DirInfo : SearchRec;
486            filenames : ARRAY[1..5] of STRING[12];
487            q, r, s, t : INTEGER;
```

```
488             BEGIN
489               TextMode(mono);
490               ClearLCDAlpha;
491               message := 'FISHER Service';    Write_XY_LCD( 8, 2 );
492               message := 'Use Function   ';   Write_XY_LCD( 8, 5 );
493               message := 'Keys at right';     Write_XY_LCD( 8, 7 );
494               message := 'to select the ';    Write_XY_LCD( 8, 9 );
495               message := 'I/D of the valve';  Write_XY_LCD( 8, 11 );
496               message := 'to be Displayed';   Write_XY_LCD( 8, 13 );
497               t := 1;
498               FindFirst( 'C:\*.CF6', AnyFile, DirInfo );
499               filenames[t] := DirInfo.Name;
500               WHILE (DosError=0) DO
501                 BEGIN
502                   INC(t);
503                   FindNext( DirInfo );
504                   filenames[t] := DirInfo.Name;
505                 END;
506               beep(2);
507               FOR r := 1 TO t-1 DO
508                 BEGIN
509                   Write( filenames[r] + '     ' );
510                   message := filenames[r];
511                   message[0] := CHR( POS( '.', message )-1);
512                   IF (message[0]=#00) THEN message[0] := #28;
513                   filenames[r] := message;
514                   VAL( message[0], s, q );
515                   WriteLN( s:5, q:5, '  '+filenames[r] );
516                   Write_XY_LCD( 23, r*4-2 );
517                 END;
518               finished := FALSE;
519               PORT[rst_key] := 0;
520               REPEAT
521                 test_d1 := PORT[porta];
522                 test_d2 := test_d1 AND $20;
523               UNTIL (test_d2=$20);
524               key_num := test_d1 AND $1F;
525               PORT[rst_key] := $80;
526               beep(1);
527               CASE key_num OF
528                 0 : file_name := filenames[1];
529                 4 : file_name := filenames[2];
530                 8 : file_name := filenames[3];
531                 12 : file_name := filenames[4];
532                 19 : finished := TRUE;
533               END;
534               file_name_up     := file_name + '.up1';
535               file_name_down   := file_name + '.dw1';
536               file_name_config := file_name + '.cfg';
537               ASSIGN( binary_image, file_name_config );
538               RESET( binary_image, $200 );
539               BlockRead( binary_image, tag_form ,1 );
540               CLOSE( binary_image );
541               ASSIGN( binary_image, file_name_up );
542               RESET( binary_image, $EA60 );
543               BlockRead( binary_image, up_rec ,1 );
544               CLOSE( binary_image );
545               ASSIGN( binary_image, file_name_down );
546               RESET( binary_image, $EA60 );
547               BlockRead( binary_image, down_rec ,1 );
548               CLOSE( binary_image );
549               graph_it := TRUE;
550               new_data := FALSE;
551               beep(2);
552             END;
553             {---------------------------------------------------------------}
554
555             {---------------------------------------------------------------}
556             PROCEDURE graph_data_lcd_pres1;
557             VAR
558               p, p1, x, x1, y, y1, z, z1 : INTEGER;
559                              rr, ss : STRING;
```

```
560              BEGIN
561                GraphDriver := HercMono;
562                GraphMode := HercMonoHi;
563                InitGraph( GraphDriver, GraphMode, '');
564                SetActivePage(1);
565                SetVisualPage(1);
566                SetTextJustify( CenterText, CenterText );
567                SetTextStyle( SmallFont, HorizDir, 10 );
568                Rectangle( 231, 109, 488, 239 );
569                OutTextXY( 370, 174, 'WORKING' );
570                SetTextStyle( SmallFont, HorizDir, 2 );
571                ss := COPY(tag_form.test_window, 1, 3);
572                IF (ss[1]=' ') THEN DELETE(ss, 1, 1);
573                VAL( ss, z1, z ); STR( z1:4, rr );
574                CASE z1 OF
575                   10 : OutTextXY( 370, 235, '0        5        10       15       20' );
576                   20 : OutTextXY( 370, 235, '0        10       20       30       40' );
577                   50 : OutTextXY( 370, 235, '0        25       50       75       100' );
578                  100 : OutTextXY( 370, 235, '0        50       100      150      200' );
579                  200 : OutTextXY( 370, 235, '0        100      200      300      400' );
580                  500 : OutTextXY( 370, 235, '0        250      500      750      1000' );
581                END;
582                SetTextStyle( SmallFont, HorizDir, 4 );
583                OutTextXY( 360, 220, '  Time in Seconds ' );
584                SetTextStyle( SmallFont, VertDir, 2 );
585                OutTextXY( 252, 171, '0  5 10 15 20 25 30 35 40 45 50');
586                SetTextStyle( SmallFont, VertDir, 4 );
587                OutTextXY( 243, 173, 'Supply - PSI');
588                copy_crt_lcd;
589                clear_center_graphics;
590                x1 := 258;
591                y1 := 229 - ABS(down_rec[0].pres1) * 10 DIV 237;
592                FOR p:= 0 TO 4999 DO
593                   BEGIN
594                     x := 258 + p DIV 44;
595                     y := 229 - ABS(down_rec[p].pres1) * 10 DIV 237;
596                     LINE( x1, y1, x, y );
597                     x1 := x;
598                     y1 := y;
599                   END;
600                x1 := 372;
601                y1 := 229 - ABS(up_rec[4999].pres1) * 10 DIV 237;
602                FOR p:= 0 TO 4999 DO
603                   BEGIN
604                     x := 372 + p DIV 44;
605                     y := 229 - ABS(up_rec[4999-p].pres1) * 10 DIV 237;
606                     LINE( x1, y1, x, y );
607                     x1 := x;
608                     y1 := y;
609                   END;
610                copy_crt_lcd;
611              END;
612  {----------------------------------------------------------------}
613
614  {----------------------------------------------------------------}
615  PROCEDURE graph_data_lcd_pres2;
616  VAR
617     p, p1, x, x1, y, y1, z, z1 : INTEGER;
618                    rr, ss : STRING;
619              BEGIN
620                GraphDriver := HercMono;
621                GraphMode := HercMonoHi;
622                InitGraph( GraphDriver, GraphMode, '');
623                SetActivePage(1);
624                SetVisualPage(1);
625                SetTextJustify( CenterText, CenterText );
626                SetTextStyle( SmallFont, HorizDir, 10 );
627                Rectangle( 231, 109, 488, 239 );
628                OutTextXY( 370, 174, 'WORKING' );
629                SetTextStyle( SmallFont, HorizDir, 2 );
630                ss := COPY(tag_form.test_window, 1, 3);
631                IF (ss[1]=' ') THEN DELETE(ss, 1, 1);
632                VAL( ss, z1, z ); STR( z1:4, rr );
```

```
633            CASE z1 OF
634                 10 : OutTextXY( 370, 235, '0         5          10          15          20' );
635                 20 : OutTextXY( 370, 235, '0        10          20          30          40' );
636                 50 : OutTextXY( 370, 235, '0        25          50          75         100' );
637                100 : OutTextXY( 370, 235, '0        50         100         150         200' );
638                200 : OutTextXY( 370, 235, '0       100         200         300         400' );
639                500 : OutTextXY( 370, 235, '0       250         500         750        1000' );
640                END;
641             SetTextStyle( SmallFont, HorizDir, 4 );
642             OutTextXY( 360, 220, '    Time in Seconds ' );
643             SetTextStyle( SmallFont, VertDir, 2 );
644             OutTextXY( 252, 171, '0   5 10 15 20 25 30 35 40 45 50');
645             SetTextStyle( SmallFont, VertDir, 4 );
646             OutTextXY( 243, 173, 'Transducer - PSI');
647             copy_crt_lcd;
648             clear_center_graphics;
649             x1 := 258;
650             y1 := 229 - ABS(down_rec[0].pres2) * 10 DIV 237;
651             FOR p:= 0 TO 4999 DO
652                BEGIN
653                  x := 258 + p DIV 44;
654                  y := 229 - ABS(down_rec[p].pres2) * 10 DIV 237;
655                  LINE( x1, y1, x, y );
656                  x1 := x;
657                  y1 := y;
658                END;
659             x1 := 372;
660             y1 := 229 - ABS(up_rec[4999].pres2) * 10 DIV 237;
661             FOR p:= 0 TO 4999 DO
662                BEGIN
663                  x := 372 + p DIV 44;
664                  y := 229 - ABS(up_rec[4999-p].pres2) * 10 DIV 237;
665                  LINE( x1, y1, x, y );
666                  x1 := x;
667                  y1 := y;
668                END;
669             copy_crt_lcd;
670         END;
671  {---------------------------------------------------------------}
672
673  {---------------------------------------------------------------}
674  PROCEDURE graph_data_lcd_pres3;
675  VAR
676       p, p1, x, x1, y, y1, z, z1 : INTEGER;
677                       rr, ss : STRING;
678         BEGIN
679             GraphDriver := HercMono;
680             GraphMode := HercMonoHi;
681             InitGraph( GraphDriver, GraphMode, '');
682             SetActivePage(1);
683             SetVisualPage(1);
684             SetTextJustify( CenterText, CenterText );
685             SetTextStyle( SmallFont, HorizDir, 10 );
686             Rectangle( 231, 109, 488, 239 );
687             OutTextXY( 370, 174, 'WORKING' );
688             SetTextStyle( SmallFont, HorizDir, 2 );
689             ss := COPY(tag_form.test_window, 1, 3);
690             IF (ss[1]=' ') THEN DELETE(ss, 1, 1);
691             VAL( ss, z1, z );  STR( z1:4, rr );
692            CASE z1 OF
693                 10 : OutTextXY( 370, 235, '0         5          10          15          20' );
694                 20 : OutTextXY( 370, 235, '0        10          20          30          40' );
695                 50 : OutTextXY( 370, 235, '0        25          50          75         100' );
696                100 : OutTextXY( 370, 235, '0        50         100         150         200' );
697                200 : OutTextXY( 370, 235, '0       100         200         300         400' );
698                500 : OutTextXY( 370, 235, '0       250         500         750        1000' );
699                END;
700             SetTextStyle( SmallFont, HorizDir, 4 );
701             OutTextXY( 360, 220, '    Time in Seconds ' );
702             SetTextStyle( SmallFont, VertDir, 2 );
703             OutTextXY( 252, 171, '0   5 10 15 20 25 30 35 40 45 50');
704             SetTextStyle( SmallFont, VertDir, 4 );
705             OutTextXY( 243, 173, 'Relay - PSI');
706             copy_crt_lcd;
```

```
707              clear_center_graphics;
708              x1 := 258;
709              y1 := 229 - ABS(down_rec[0].pres3) * 10 DIV 237;
710              FOR p:= 0 TO 4999 DO
711                  BEGIN
712                      x := 258 + p DIV 44;
713                      y := 229 - ABS(down_rec[p].pres3) * 10 DIV 237;
714                      LINE( x1, y1, x, y );
715                      x1 := x;
716                      y1 := y;
717                  END;
718              x1 := 372;
719              y1 := 229 - ABS(up_rec[4999].pres3) * 10 DIV 237;
720              FOR p:= 0 TO 4999 DO
721                  BEGIN
722                      x := 372 + p DIV 44;
723                      y := 229 - ABS(up_rec[4999-p].pres3) * 10 DIV 237;
724                      LINE( x1, y1, x, y );
725                      x1 := x;
726                      y1 := y;
727                  END;
728              copy_crt_lcd;
729          END;
730  {----------------------------------------------------------------}
731
732  {----------------------------------------------------------------}
733      PROCEDURE graph_data_lcd_pres4;
734      VAR
735          p, p1, x, x1, y, y1, z, z1 : INTEGER;
736                      rr, ss : STRING;
737      BEGIN
738          GraphDriver := HercMono;
739          GraphMode := HercMonoHi;
740          InitGraph( GraphDriver, GraphMode, '');
741          SetActivePage(1);
742          SetVisualPage(1);
743          SetTextJustify( CenterText, CenterText );
744          SetTextStyle( SmallFont, HorizDir, 10 );
745          Rectangle( 231, 189, 488, 239 );
746          OutTextXY( 370, 174, 'WORKING' );
747          SetTextStyle( SmallFont, HorizDir, 2 );
748          ss := COPY(tag_form.test_window, 1, 3);
749          IF (ss[1]=' ') THEN DELETE(ss, 1, 1);
750          VAL( ss, z1, z );  STR( z1:4, rr );
751          CASE z1 OF
752              10 : OutTextXY( 370, 235, '0         5        10        15        20' );
753              20 : OutTextXY( 370, 235, '0        10        20        30        40' );
754              50 : OutTextXY( 370, 235, '0        25        50        75       100' );
755             100 : OutTextXY( 370, 235, '0        50       100       150       200' );
756             200 : OutTextXY( 370, 235, '0       100       200       300       400' );
757             500 : OutTextXY( 370, 235, '0       250       500       750      1000' );
758          END;
759          SetTextStyle( SmallFont, HorizDir, 4 );
760          OutTextXY( 360, 220, '  Time in Seconds ' );
761          SetTextStyle( SmallFont, VertDir, 2 );
762          OutTextXY( 252, 171, '0  5 10 15 20 25 30 35 40 45 50');
763          SetTextStyle( SmallFont, VertDir, 4 );
764          OutTextXY( 243, 173, 'Actuator - PSI');
765          copy_crt_lcd;
766          clear_center_graphics;
767          x1 := 258;
768          y1 := 229 - ABS(down_rec[0].pres4) * 10 DIV 237;
769          FOR p:= 0 TO 4999 DO
770              BEGIN
771                  x := 258 + p DIV 44;
772                  y := 229 - ABS(down_rec[p].pres4) * 10 DIV 237;
773                  LINE( x1, y1, x, y );
774                  x1 := x;
775                  y1 := y;
776              END;
777          x1 := 372;
778          y1 := 229 - ABS(up_rec[4999].pres4) * 10 DIV 237;
779          FOR p:= 0 TO 4999 DO
```

```
            BEGIN
               x := 372 + p DIV 44;
               y := 229 - ABS(up_rec[4999-p].pres4) * 10 DIV 237;
               LINE( x1, y1, x, y );
               x1 := x;
               y1 := y;
            END;
         copy_crt_lcd;
      END;
   {------------------------------------------------------------------}

{------------------------------------------------------------------}
   PROCEDURE graph_data_lcd_dsplcmnt;
   VAR
      p, p1, x, x1, y, y1, z, z1 : INTEGER;
                        rr, ss : STRING;
   BEGIN
      GraphDriver := HercMono;
      GraphMode := HercMonoHi;
      InitGraph( GraphDriver, GraphMode, '' );
      SetActivePage(1);
      SetVIsualPage(1);
      SetTextJustify( CenterText, CenterText );
      SetTextStyle( SmallFont, HorizDir, 10 );
      Rectangle( 231, 189, 488, 239 );
      OutTextXY( 370, 174, 'WORKING' );
      SetTextStyle( SmallFont, HorizDir, 2 );
      ss := COPY(tag_form.test_window, 1, 3);
      IF (ss[1]=' ') THEN DELETE(ss, 1, 1);
      VAL( ss, z1, z );  STR( z1:4, rr );
      CASE z1 OF
         10 : OutTextXY( 370, 235, '0          5         10        15        20' );
         20 : OutTextXY( 370, 235, '0         10         20        30        40' );
         50 : OutTextXY( 370, 235, '0         25         50        75       100' );
        100 : OutTextXY( 370, 235, '0         50        100       150       200' );
        200 : OutTextXY( 370, 235, '0        100        200       300       400' );
        500 : OutTextXY( 370, 235, '0        250        500       750      1000' );
      END;
      SetTextStyle( SmallFont, HorizDir, 4 );
      OutTextXY( 360, 220, '    Time in Seconds ' );
      SetTextStyle( SmallFont, VertDir, 2 );
      OutTextXY( 252, 171, '0 .2 .4 .6 .8 1 .2 .4 .6 .8 2');
      SetTextStyle( SmallFont, VertDir, 4 );
      OutTextXY( 243, 173, 'Travel - Inch');
      copy_crt_lcd;
      clear_center_graphics;
      x1 := 258;
      y1 := 227 - ABS(down_rec[0].dsplcmnt) DIV 116;
      FOR p:= 0 TO 4999 DO
         BEGIN
            x := 258 + p DIV 44;
            y := 227 - ABS(down_rec[p].dsplcmnt) DIV 116;
            LINE( x1, y1, x, y );
            x1 := x;
            y1 := y;
         END;
      x1 := 372;
      y1 := 227 - ABS(up_rec[4999].dsplcmnt) DIV 116;
      FOR p:= 0 TO 4999 DO
         BEGIN
            x := 372 + p DIV 44;
            y := 227 - ABS(up_rec[4999-p].dsplcmnt) DIV 116;
            LINE( x1, y1, x, y );
            x1 := x;
            y1 := y;
         END;
      copy_crt_lcd;
   END;
   {------------------------------------------------------------------}

{------------------------------------------------------------------}
   PROCEDURE graph_data_lcd;
```

```
852                         BEGIN
853                             ClearLCDAlpha;
854                             message := 'FISHER Service - Select Channel';   Write_XY_LCD( 0, 2 );
855                             message := '        Supply Pressure = #2   ';   Write_XY_LCD( 0, 5 );
856                             message := '     Transducer Pressure = #3   ';  Write_XY_LCD( 0, 7 );
857                             message := '           Relay Pressure = #4   '; Write_XY_LCD( 0, 9 );
858                             message := '        Actuator Pressure = #5   ';  Write_XY_LCD( 0, 11 );
859                             message := '           Valve Position = #6   ';  Write_XY_LCD( 0, 13 );
860                             message := 'Press [Enter] to QUIT             '; Write_XY_LCD( 0, 15 );
861
862                             finished := FALSE;
863                             REPEAT
864                                 PORT[rst_key] := 0;
865                                 REPEAT
866                                     test_d1 := PORT[porta];
867                                     test_d2 := test_d1 AND $20;
868                                 UNTIL (test_d2=$20);
869                                 key_num := test_d1 AND $1F;
870                                 PORT[rst_key] := $80;
871                                 beep(1);
872                                 CASE key_num OF
873                                     10 : graph_data_lcd_pres1;
874                                     11 : graph_data_lcd_pres2;
875                                      5 : graph_data_lcd_pres3;
876                                      6 : graph_data_lcd_pres4;
877                                      7 : graph_data_lcd_dsplcmnt;
878                                     19 : finished := TRUE;
879                                 END;
880                             UNTIL (finished);
881                             finished := FALSE;
882                         END;
883                         {------------------------------------------------------------------}
884                         PROCEDURE display_new_data;
885                         BEGIN
886                             graph_it := TRUE;
887                         END;
888                         {------------------------------------------------------------------}
889
890                         {------------------------------------------------------------------}
891                         PROCEDURE calibrate_the_system;
892                         BEGIN
893                             EXEC('CALIBRATE.EXE', '');
894                             create_menu_screens;
895                             beep(3);
896                         END;
897                         {------------------------------------------------------------------}
898                         PROCEDURE select_data_file;
899                         VAR
900                             DirInfo : SearchRec;
901                             filenames : ARRAY[1..5] of STRING[12];
902                             q, r, s, t : INTEGER;
903                         BEGIN
904                             ClearLCDAlpha;
905                             TextMode(mono);
906                             message := 'FISHER Service';   Write_XY_LCD( 0, 2 );
907                             message := 'Use Function   ';  Write_XY_LCD( 0, 5 );
908                             message := 'Keys at right';    Write_XY_LCD( 0, 7 );
909                             message := 'to select the ';   Write_XY_LCD( 0, 9 );
910                             message := 'I/D of the valve'; Write_XY_LCD( 0, 11 );
911                             message := 'being tested   ';  Write_XY_LCD( 0, 13 );
912                             t := 1;
913                             FindFirst( 'C:\*.CF6', AnyFile, DirInfo );
914                             filenames[t] := DirInfo.Name;
915                             WHILE (DosError=0) DO
916                                 BEGIN
917                                     INC(t);
918                                     FindNext( DirInfo );
919                                     filenames[t] := DirInfo.Name;
920                                 END;
921                             beep(2);
922                             FOR r := 1 TO t-1 DO
```

```
923                         BEGIN
924                             message := filenames[r];
925                             Write( message+'    ' );
926                             message[0] := CHR(POS( '.', message)-1);
927                             IF (message[0]=#00) THEN message[0] := #02;
928                             filenames[r] := message;
929                             VAL( message[0], s, q );
930                             WriteLN( s:5, q:5, '    '+filenames[r] );
931                             Write_XY_LCD( 23, r*4-2 );
932                         END;
933                     finished := FALSE;
934                     PORT[rst_key] := 0;
935                     REPEAT
936                         test_d1 := PORT[porta];
937                         test_d2 := test_d1 AND $20;
938                     UNTIL (test_d2=$20);
939                     key_num := test_d1 AND $1F;
940                     PORT[rst_key] := $00;
941                     beep(1);
942                     CASE key_num OF
943                         0 : file_name := filenames[1];
944                         4 : file_name := filenames[2];
945                         8 : file_name := filenames[3];
946                         12 : file_name := filenames[4];
947                         19 : finished := TRUE;
948                     END;
949                     file_name_up     := file_name + '.up1';
950                     file_name_down   := file_name + '.dw1';
951                     file_name_config := file_name + '.cfg';
952                     tag_form_test_name := file_name;
954                     RESET( binary_image, $200 );
955                     BlockRead( binary_image, tag_form ,1 );
956                     CLOSE( binary_image );
957                     beep(2);
958                 END;
959             {-----------------------------------------------------------------}
960             PROCEDURE save_data_file;
961             BEGIN
962                 ASSIGN( binary_image, file_name_up );
963                 REWRITE( binary_image, $EA60 );
964                 BlockWrite( binary_image, up_rec ,1 );
965                 CLOSE( binary_image );
966                 ASSIGN( binary_image, file_name_down );
967                 REWRITE( binary_image, $EA60 );
968                 BlockWrite( binary_image, down_rec ,1 );
969                 CLOSE( binary_image );
970                 ASSIGN( binary_image, file_name_config );
971                 REWRITE( binary_image, $200 );
972                 BlockWrite( binary_image, tag_form ,1 );
973                 CLOSE( binary_image );
974                 beep(2);
975             END;
976             {-----------------------------------------------------------------}
977             PROCEDURE zero_output_current;
978             BEGIN
979                 volt_out := 0;
980                 PORT[dtoa_h] := HI(volt_out SHL 4); { Bit 4 to bit 11 must go first }
981                 PORT[dtoa_l] := LO(volt_out SHL 4); { followed by bit 0 to bit 3   .}
982             END;
983             {-----------------------------------------------------------------}
984             PROCEDURE time_stamp_file;
985             VAR
986                 s                              : STRING;
987                 Year, Month, Day, DayofWeek    : WORD;
988                 YearS, MonthS, DayS            : STRING;
989                 Hour, Minute, Second, Sec100   : WORD;
990                 HourS, MinuteS, SecondS        : STRING;
991
992             BEGIN
993                 GetDate( Year, Month, Day, DayofWeek );
994                 GetTime( Hour, Minute, Second, Sec100 );
995                 STR( Year:4, YearS );
996                 STR( Month:2, MonthS );
997                 STR( Day:2, DayS );
```

```
998                        STR( Hour:2, HourS );
999                        STR( Minute:2, MinuteS );
1000                       STR( Second:2, SecondS );
1001
1002                       s := MonthS + '/' + DayS + '/' + YearS + ' e.v. ';
1003                       FOR t1 := 1 TO 10 DO
1004                           BEGIN
1005                               IF (s[t1]=' ') THEN s[t1] := '0';
1006                           END;
1007                       tag_form.test_date := s;
1008
1009                       s := HourS + ':' + MinuteS + ':' + SecondS;
1010                       FOR t1 := 1 TO 10 DO
1011                           BEGIN
1012                               IF (s[t1]=' ') THEN s[t1] := '0';
1013                           END;
1014                       tag_form.test_time := s;
1015                   END;
1016               {------------------------------------------------------------}
1017               PROCEDURE save_valve_data;
1018                   BEGIN
1019
1020                       keypad_yes_no;
1021                       IF (yes) THEN BEGIN
1022                                       message := 'Saving as - ' + file_name;
1023                                       OutTextXY( 240, 210, message );
1024                                       copy_crt_lcd;
1025                                       time_stamp_file;
1026                                       save_data_file;
1027                                       beep(5);
1028                                     END;
1029                   END;
1030               {------------------------------------------------------------}
1031               PROCEDURE display_results;
1032                   BEGIN
1033                       ClearLCDAlpha;
1034                       message := 'FISHER Service';     Write_XY_LCD( 0, 2 );
1035                       message := 'Use Function    ';   Write_XY_LCD( 0, 5 );
1036                       message := 'Keys at right';      Write_XY_LCD( 0, 7 );
1037                       message := 'to select the ';     Write_XY_LCD( 0, 9 );
1038                       message := 'TYPE of data to';    Write_XY_LCD( 0, 11 );
1039                       message := 'to be Displayed';    Write_XY_LCD( 0, 13 );
1040                       message := 'data from DISK';     Write_XY_LCD( 17, 5 );
1041                       message := 'data from TEST';     Write_XY_LCD( 17, 9 );
1042                       graph_it := FALSE;
1043                       finished := FALSE;
1044                       PORT[rst_key] := 0;
1045                       REPEAT
1046                           test_d1 := PORT[porta];
1047                           test_d2 := test_d1 AND $20;
1048                       UNTIL (test_d2=$20);
1049                       key_num := test_d1 AND $1F;
1050                       PORT[rst_key] := $80;
1051                       beep(1);
1052                       CASE key_num OF
1053                           4 : select_disk_data;
1054                           8 : display_new_data;
1055                           19 : finished := TRUE;
1056                       END;
1057                       IF (graph_it) THEN graph_data_lcd;
1058                       IF (new_data) THEN save_valve_data;
1059                       create_menu_screens;
1060                   END;
1061               {------------------------------------------------------------}
1062               PROCEDURE stroke_the_valve;
1063                   BEGIN
1064                       zero_output_current;
1065                       zero_counter;
1066                       select_data_file;
1067                       select_time_window;
1068                       zero_counter;
1069                       beep(5);
1070                       message := 'Fisher Service - DOWN    ';  Write_XY_LCD( 0, 1 );
1071                       ramp_to_energized_state;
1072                       message := 'Fisher Service - HOLDING ';  Write_XY_LCD( 0, 1 );
```

```
1873                              DELAY(5000);
1874                              beep(5);
1875                              message := 'Fisher Service - UP      ';   Write_XY_LCD( 0, 1 );
1876                              ramp_to_rest_state;
1877                              message := 'Fisher Service - COMPLETE ';   Write_XY_LCD( 0, 1 );
1878                              zero_output_current;
1879                              create_menu_screens;
1880                              new_data := TRUE;
1881                           END;
1882                     {------------------------------------------------------------------}
1883                     PROCEDURE select_by_keypad;
1884                     BEGIN
1885
1886                          finished := FALSE;
1887                          PORT[rst_key] := 0;
1888                          REPEAT
1889                             REPEAT
1890                                test_d1 := PORT[porta];
1891                                test_d2 := test_d1 AND $20;
1892                             UNTIL (test_d2=$20);
1893                             key_num := test_d1 AND $1F;
1894                             PORT[rst_key] := $80;
1895                             beep(1);
1896                             CASE key_num OF
1897                                0  : create_menu_screens;
1898                                4  : stroke_the_valve;
1899                                8  : display_results;
1900                                12 : calibrate_the_system;
1901                                15 : EXEC('VIEW.EXE', '');
1902                                19 : BEGIN
1903                                        finished := TRUE;
1904                                     END;
1905                             END;
1906                          UNTIL finished;
1907                     END;
1908                     {------------------------------------------------------------------}
1909                     BEGIN
1910                          ClearLCDAlpha;
1911                          zero_output_current;
1912                          TextMode(mono);
1913                          initialize;
1914                          create_menu_screens;
1915                          select_by_keypad;
1916                          IF (finished) THEN TextMode(mono);
1917                     END.
1918                     {------------------------------------------------------------------}
1919
```

| | | | | | | | | | | | |
|---|---|---|---|---|---|---|---|---|---|---|---|
| A | 162 | 261 | | | | | | | | | |
| A1 | 71 | 165 | 167 | 318 | 320 | 321 | | | | | |
| AA6 | 68 | | | | | | | | | | |
| ABS | 591 | 595 | | | | | | | | | |
| ABSOLUTE | 67 | 68 | 93 | | | | | | | | |
| ACSRY_1 | 40 | | | | | | | | | | |
| ACSRY_2 | 41 | | | | | | | | | | |
| ACSRY_3 | 42 | | | | | | | | | | |
| ACSRY_4 | 43 | | | | | | | | | | |
| ACSRY_5 | 44 | | | | | | | | | | |
| ACTUATOR | 34 | 35 | | | | | | | | | |
| ANYFILE | 498 | 913 | | | | | | | | | |
| ASSIGN | 537 | 541 | 545 | 953 | 962 | 966 | 970 | | | | |
| ATOD | 84 | 117 | 185 | 189 | 190 | | | | | | |
| A_D_VALU | 98 | 191 | 192 | 192 | 217 | 219 | 221 | 223 | 244 | 246 | 248 | 250 |
| B | 163 | 288 | 310 | | | | | | | | |
| B0 | 131 | 184 | 300 | | | | | | | | |
| B1 | 71 | 160 | 162 | 163 | 290 | 420 | 422 | 422 | | | |
| B2 | 71 | 317 | 318 | 334 | 335 | | | | | | |
| BBBB | 318 | 335 | | | | | | | | | |
| BALANCE | 30 | | | | | | | | | | |

| | | | | | | | | | | | | | | | | |
|---|---|---|---|---|---|---|---|---|---|---|---|---|---|---|---|---|
| BASE | 79 | 116 | 117 | 118 | 119 | 120 | 121 | 122 | 123 | 124 | 125 | 126 | 127 | | | |
| BEEP | 102 | 115 | 229 | 256 | 324 | 364 | 376 | 432 | 449 | 464 | 473 | 506 | 526 | 551 | 871 | 895 | 921 |
| | 895 | 921 | 941 | 957 | 974 | 1027 | 1051 | 1069 | 1074 | 1095 | | | | | | |
| BINARY_I | 94 | 537 | 538 | 539 | 540 | 541 | 542 | 543 | 544 | 545 | 546 | 547 | 548 | 953 | 954 | 955 | 956 |
| | 955 | 956 | 962 | 963 | 964 | 965 | 966 | 967 | 968 | 969 | 970 | 971 | 972 | 973 | | |
| BLOCKREA | 539 | 543 | 547 | 955 | | | | | | | | | | | | |
| BLOCKWRI | 964 | 968 | 972 | | | | | | | | | | | | | |
| BODY_SIZ | 25 | | | | | | | | | | | | | | | |
| BODY_STY | 24 | | | | | | | | | | | | | | | |
| BYTE | 87 | 88 | 93 | 102 | 148 | 152 | 192 | 261 | 261 | 263 | | | | | | |
| C | 124 | 126 | | | | | | | | | | | | | | |
| C00 | 67 | | | | | | | | | | | | | | | |
| C1 | 71 | 315 | 317 | 332 | 334 | | | | | | | | | | | |
| CALIBRAT | 891 | 1100 | | | | | | | | | | | | | | |
| CENTERTE | 566 | 566 | 625 | 625 | 684 | 684 | 743 | 743 | 882 | 882 | | | | | | |
| CHR | 511 | 926 | | | | | | | | | | | | | | |
| CLEARLCD | 277 | 419 | 446 | 498 | 853 | 984 | 1033 | 1118 | | | | | | | | |
| CLEAR_CE | 327 | 559 | 648 | 707 | 766 | 825 | | | | | | | | | | |
| CLOSE | 540 | 544 | 548 | 956 | 965 | 969 | 973 | | | | | | | | | |
| CNTER_H | 85 | 125 | | | | | | | | | | | | | | |
| CNTER_L | 85 | 124 | 179 | | | | | | | | | | | | | |
| CNTR_VAL | 83 | 179 | 225 | 252 | | | | | | | | | | | | |
| COMMENT | 45 | | | | | | | | | | | | | | | |
| COPY | 571 | 630 | 689 | 748 | 887 | | | | | | | | | | | |
| COPY_CRT | 298 | 363 | 375 | 463 | | | | | | | | | | | | |
| CREATE_M | 342 | 894 | 1059 | 1079 | 1097 | 1114 | | | | | | | | | | |
| CRT | 9 | | | | | | | | | | | | | | | |
| CURRENT | 13 | 215 | 242 | | | | | | | | | | | | | |
| D | 125 | 127 | | | | | | | | | | | | | | |
| D1 | 160 | 162 | | | | | | | | | | | | | | |
| DATA | 148 | 146 | 152 | 154 | | | | | | | | | | | | |
| DATE_S | 78 | | | | | | | | | | | | | | | |
| DAT_PNT | 97 | 207 | 215 | 217 | 219 | 221 | 223 | 225 | 227 | | | | | | | |
| DAY | 76 | 361 | 987 | 993 | 997 | | | | | | | | | | | |
| DAYOFWEE | 76 | 361 | 987 | 993 | | | | | | | | | | | | |
| DAYS | 996 | 997 | 1002 | | | | | | | | | | | | | |
| DEC | 109 | 201 | 253 | 254 | | | | | | | | | | | | |
| DELAY | 186 | 188 | 214 | 241 | 1073 | | | | | | | | | | | |
| DELETE | 572 | 631 | 690 | 749 | 888 | | | | | | | | | | | |
| DIRINFO | 485 | 498 | 499 | 503 | 504 | 908 | 913 | 914 | 918 | 919 | | | | | | |
| DISPLACE | 81 | | | | | | | | | | | | | | | |
| DISPLAY | 884 | 1031 | 1054 | 1099 | | | | | | | | | | | | |
| DOS | 9 | | | | | | | | | | | | | | | |
| DOSERROR | 500 | 915 | | | | | | | | | | | | | | |
| DOWN_REC | 68 | 133 | 215 | 21. | 219 | 221 | 223 | 225 | 547 | 591 | 595 | 650 | 654 | 709 | 713 | 768 | 772 |
| | 768 | 772 | 827 | 831 | 768 | | | | | | | | | | | |
| DSPLCMNT | 13 | 225 | 252 | 827 | 831 | 837 | 841 | | | | | | | | | |
| DSPLY_TR | 386 | | | | | | | | | | | | | | | |
| DSPLY_XD | 382 | | | | | | | | | | | | | | | |
| DTOA_H | 84 | 123 | | | | | | | | | | | | | | |
| DTOA_L | 84 | 122 | 129 | 212 | 239 | 981 | | | | | | | | | | |
| EA60 | 542 | 546 | 963 | 967 | | | | | | | | | | | | |
| EXEC | 893 | 1101 | | | | | | | | | | | | | | |
| F | 189 | 281 | 282 | 283 | 304 | 305 | 306 | 430 | 472 | 524 | 869 | 939 | 1049 | 1093 | | |
| F000 | 132 | 133 | | | | | | | | | | | | | | |
| FALSE | 320 | 465 | 466 | 518 | 550 | 862 | 881 | 933 | 1042 | 1043 | 1085 | 1086 | | | | |
| FILENAME | 486 | 499 | 504 | 509 | 510 | 513 | 515 | | | | | | | | | |
| FILE_NAM | 95 | 95 | 96 | 96 | | | | | | | | | | | | |
| FILLCHAR | 132 | 133 | | | | | | | | | | | | | | |
| FINDFIRS | 498 | 913 | | | | | | | | | | | | | | |
| FINDNEXT | 503 | 918 | | | | | | | | | | | | | | |
| FINISHED | 89 | 518 | | | | | | | | | | | | | | |
| FIRST_BY | 73 | 312 | 319 | 320 | 329 | | | | | | | | | | | |
| FIX_TIME | 72 | 135 | 135 | 199 | | | | | | | | | | | | |
| FLOW_DIR | 28 | | | | | | | | | | | | | | | |
| GETDATE | 361 | 993 | | | | | | | | | | | | | | |
| GETTIME | 362 | 994 | | | | | | | | | | | | | | |
| GRAPH | 9 | | | | | | | | | | | | | | | |
| GRAPHDRI | 78 | 344 | 346 | 365 | 456 | 561 | 563 | 620 | 622 | 679 | 681 | 738 | 740 | 797 | 799 | |
| GRAPHMOD | 78 | 345 | 346 | 365 | | | | | | | | | | | | |
| GRAPH_DA | 556 | 615 | 674 | 733 | 792 | 851 | 873 | 874 | 875 | | | | | | | |
| GRAPH_IT | 74 | 549 | 886 | 1042 | 1057 | | | | | | | | | | | |
| HERCMONO | 344 | 345 | 561 | 562 | 620 | 621 | 679 | 680 | 738 | | | | | | | |
| HI | 211 | 238 | 980 | | | | | | | | | | | | | |
| HORIZDIR | 349 | 368 | 459 | 567 | 570 | 582 | 626 | | | | | | | | | |

| | | | | | | | | | | | | | | | | |
|---|---|---|---|---|---|---|---|---|---|---|---|---|---|---|---|---|
| HOUR | 77 | 362 | 989 | 994 | 998 | | | | | | | | | | | |
| HOURS | 990 | 998 | 1009 | | | | | | | | | | | | | |
| INC | 226 | 227 | 266 | 267 | 268 | 269 | 270 | 271 | 272 | 273 | 502 | 917 | | | | |
| INITGRAP | 346 | 365 | | | | | | | | | | | | | | |
| INITIALI | 113 | 1113 | | | | | | | | | | | | | | |
| INLET_PS | 31 | | | | | | | | | | | | | | | |
| IO_A | 50 | | | | | | | | | | | | | | | |
| IO_B | 51 | 142 | 146 | 154 | | | | | | | | | | | | |
| IO_C | 52 | 143 | 144 | 145 | 147 | 148 | 149 | 155 | 156 | 157 | 300 | | | | | |
| IO_CTRL | 53 | 279 | 301 | | | | | | | | | | | | | |
| KEYPAD_Y | 454 | 1020 | | | | | | | | | | | | | | |
| KEY_NUM | 88 | 430 | 433 | 472 | 474 | 524 | 527 | 869 | 872 | 939 | 942 | 1049 | 1052 | 1093 | 1096 | |
| L1 | 71 | 313 | 317 | 317 | 330 | 334 | 334 | | | | | | | | | |
| LCD_CS | 61 | 143 | 144 | 145 | 147 | 148 | 149 | 155 | 156 | 157 | | | | | | |
| LCD_DS | 59 | 143 | 145 | 147 | 149 | 155 | 157 | | | | | | | | | |
| LCD_DT | 55 | 147 | 148 | 149 | | | | | | | | | | | | |
| LCD_EN | 58 | 144 | 148 | 156 | | | | | | | | | | | | |
| LCD_NCS | 60 | | | | | | | | | | | | | | | |
| LCD_RD | 56 | | | | | | | | | | | | | | | |
| L | 54 | 143 | 144 | 145 | | | | | | | | | | | | |
| L | 57 | 143 | 144 | 145 | 147 | 148 | 149 | 155 | 156 | 157 | | | | | | |
| L | 36 | | | | | | | | | | | | | | | |
| L | 165 | | | | | | | | | | | | | | | |
| | 596 | 606 | 655 | 665 | | | | | | | | | | | | |
| | 212 | 239 | 981 | | | | | | | | | | | | | |
| | 318 | 335 | | | | | | | | | | | | | | |
| | 91 | 165 | 167 | 422 | 447 | 468 | 491 | 492 | 493 | 494 | 495 | 496 | | | | |
| | 77 | 362 | 989 | 994 | 999 | | | | | | | | | | | |
| | 990 | 999 | 1009 | | | | | | | | | | | | | |
| | 377 | 489 | 985 | 1112 | 1116 | | | | | | | | | | | |
| P. | 76 | 361 | 987 | 993 | 996 | | | | | | | | | | | |
| M | 989 | 996 | 1007 | | | | | | | | | | | | | |
| NAME | 499 | 504 | 914 | 919 | | | | | | | | | | | | |
| NEW_DATA | 73 | 550 | 1058 | 108F | 1085 | | | | | | | | | | | |
| M | 98 | 466 | 476 | | | | | | | | | | | | | |
| NOSOUND | 107 | | | | | | | | | | | | | | | |
| NUMBER | 102 | 109 | 110 | | | | | | | | | | | | | |
| OUTLET_P | 32 | | | | | | | | | | | | | | | |
| OUTTEXTX | 353 | 354 | 355 | 356 | 357 | 358 | 359 | 360 | 371 | 372 | 373 | 374 | 460 | 461 | 462 | 567 | 575 |
| P | 558 | 592 | 594 | 595 | 602 | 604 | 605 | 617 | 651 | 653 | 654 | 661 | 663 | 664 | 676 | 710 | 712 |
| | 710 | 712 | 713 | 720 | 722 | 723 | 735 | 769 | 771 | 772 | 779 | 781 | 782 | 794 | | | |
| P1 | 558 | 617 | 676 | 735 | 794 | | | | | | | | | | | |
| PACKING_ | 36 | | | | | | | | | | | | | | | |
| PCNTRL | 68 | 121 | 138 | | | | | | | | | | | | | |
| PORT | 128 | 129 | 130 | 131 | | | | | | | | | | | | |
| PORTA | 79 | 119 | 187 | 427 | 469 | 521 | 866 | 936 | 1046 | 1098 | | | | | | |
| PORTB | 79 | 119 | | | | | | | | | | | | | | |
| PORTC | 79 | 120 | 131 | 184 | | | | | | | | | | | | |
| PORTW | 179 | | | | | | | | | | | | | | | |
| POS | 511 | 926 | | | | | | | | | | | | | | |
| PRES1 | 13 | 217 | 244 | 591 | | | | | | | | | | | | |
| PRES2 | 13 | 219 | 246 | 650 | 654 | 660 | 664 | | | | | | | | | |
| PRES3 | 13 | 221 | 248 | 709 | 713 | 719 | 723 | | | | | | | | | |
| PRES4 | 13 | 223 | 250 | 768 | 772 | 778 | 782 | | | | | | | | | |
| PUSH_DOW | 29 | | | | | | | | | | | | | | | |
| Q | 487 | 514 | 515 | 902 | 929 | 930 | | | | | | | | | | |
| R | 487 | 507 | 509 | 510 | 513 | 515 | 516 | 902 | 922 | 924 | 928 | 930 | 931 | | | |
| R1 | 72 | 199 | 201 | 202 | | | | | | | | | | | | |
| RAMP_TO_ | 205 | 232 | 1071 | 1076 | | | | | | | | | | | | |
| READ_A_D | 182 | 216 | 218 | 220 | 222 | 243 | 245 | 247 | 249 | | | | | | | |
| READ_COU | 177 | 224 | 251 | | | | | | | | | | | | | |
| RECTANGL | 350 | 351 | 352 | 369 | 370 | 568 | 627 | 686 | 745 | 804 | | | | | | |
| REG_NUM | 140 | 142 | | | | | | | | | | | | | | |
| RESET | 538 | 542 | 546 | 954 | | | | | | | | | | | | |
| REVERSE | 261 | 274 | 318 | | | | | | | | | | | | | |
| REWRITE | 963 | 967 | 971 | | | | | | | | | | | | | |
| RR | 559 | 573 | 618 | 632 | 677 | 691 | 736 | 750 | 795 | 809 | | | | | | |
| RST_CTR | 86 | 127 | 174 | | | | | | | | | | | | | |
| RST_KEY | 86 | 126 | 425 | 431 | 467 | 478 | 519 | 525 | 864 | | | | | | | |
| S | 399 | 434 | 435 | 436 | 437 | 438 | 439 | 444 | 447 | 467 | 514 | 515 | 902 | 929 | 930 | 955 | 1082 |
| | 986 | 1082 | 1085 | 1085 | | | | | | | | | | | | |
| SAVE_DAT | 968 | 1026 | | | | | | | | | | | | | | |
| SAVE_VAL | 1017 | 1058 | | | | | | | | | | | | | | |
| SCREEN_T | 398 | 402 | 403 | 404 | 405 | 406 | 407 | 408 | 409 | | | | | | | |
| SEARCHRE | 485 | 928 | | | | | | | | | | | | | | |

```
SEAT_TYP   37
SEC100     77    362   989   994
SECOND     77    362   989   994   1000
SECONDS    990   1000  1009
SELECT_B   1083  1115
SELECT_D   463   898   1053  1066
SELECT_T   396   1067
SERIAL_N   22
SETACTIV   347   366   457   564   623   682   741   800
SETTEITJ   566   625   684   743   882
SETTEXTS   349   368   459   567   578   582   584   586   626
SETVISUA   348   367   458   565   624   683   742   801
SHIFT_VO   82
SHL        191   211   212   238   239   980   981
SMALLFON   567   578   582   584   586   626   629   641   643   645   685   688   780   782   784   744   747
SOUND      185
SS         559   571
STEM_SIZ   33
STR        573   632   691   750   889   995   996   997   998   999   1000
STROKE_D   12    67    68
STROKE_T   1062  1098
T          487   497   499   582   584   587   982   912   914   917   919   922
TAG_FORM   69    443   444   539   571   638   689   748   887   952   955   972   1007  1014
TAG_NUM    23
TESTING3   7
TEST_D1    87    187   188   190   191   427   428   430   469   470 - 472   521   522   524   866   867   869
           867   869   936   937   939   1046  1047  1049  1090  1091  1093
TEST_D2    87    189   191   192   428   429   470   471   522   523   867   868   937   938   1047  1048  1091
           1048  1091  1092
TEST_DAT   18    1097
TEST_NAM   17    952
TEST_TIM   19    1014
TEST_TYP   20    443
TEST_WIN   21    444   571   638
TEXTMODE   377   489   985   1112  1116
TEXT_STA   392
TIME_DEL   97    134   135   214   241   434   435   436   437   438   439   442
TIME_S     78
TIME_STA   984   1025
TRIM_SIZ   27
TRIM_STY   26
TRIPLEIF   349   368   459
TRUE       312   329   475   476   532   549   878   886   947
UP_REC     67    132   242   244   246   248   250   252   543   601   605   660
USES       9
VAL        514   573   632   691   750   889   929
VALVE_DO   75
VALVE_IN   16    69
VALVE_TR   39
VALVE_UP   75
VERTDIR    584   586   643   645   782   784   761   763   820   822
VOLT_OUT   82    208   211   212   215   226   228   235   238   239   242   253   253   979   980   981
WASTE_TI   197   213   248
WORD       71    72    76    77    987   989
WORK       263   265   266   267   268   269   270   271   272   273   274
WRITE_DA   152   168   292   321
WRITE_RE   140   162   163   164   280   281   282   283   284   285   286   287   288   289   303   304   305
           304   305   306   307   308   309   310   320
WRITE_XY   160   422   443   491   492   493   494   495   496   516   854   855
X          558   594   596   597   604   606   607   617   653   655   656   663   665   666   676   712   714
           712   714   715   722   724   725   735   771   773   774   781   783   784   794   830   832   833
           832   833   840   842   843
X1         558   590   596   597   600   606   607   617   649   655   656   659   665   666
IC1        92    93    167
Y          558   595   596   598   605   606   608   617   654   655   657   664   665   667   676   713   714
           713   714   716   723   724   726   735   772   773   775   782   783   785   794   831   832 - 834
           832   834   841   842   844
Y1         558   591   596   598   601   606   608   617   650   655   657   660
YEAR       76    361   987   993   995
YEARS      988   995   1002
YES        98    465   475   1021
Z          558   573   617   632   676   691   735   758   794   889
Z1         558   573   573   574   617   632   632   633   676   691   691   692
ZERO_COU   172   1065  1068
ZERO_OUT   977   1064  1078  1111
```

What is claimed is:

1. A method for diagnostically dynamic testing and determining the dynamic operating condition of a pneumatically operated fluid control valve assembly having a current to pressure transducer, a valve actuator connected to a valve flow control member for movement between respective closed and open valve positions, and a valve positioner pneumatically coupled between said current to pressure transducer and said valve actuator, said method comparing a dynamic output of said valve assembly in response to a dynamic input to said valve assembly and comprising the steps of:

providing a variable control current signal input to said channel to pressure transducer and a corresponding controlled variable pneumatic pressure to the input of the valve positioner forming a dynamic input to said valve assembly to operate the valve in a dynamic test operation cycle defined by moving the flow control member between said respective closed and open valve positions;

providing a position sensor to sense movement of the flow control member;

obtaining an output signal from the position sensor corresponding to movement of the flow control member in response to said dynamic input to said valve assembly during the dynamic test operation cycle;

processing said variable control current signal and said output signal to derive valve diagnostic data representing the movement of the flow control member during the dynamic test operation cycle as a function of the variation of said variable control current signal input to said current to pressure transducer; and displaying said valve diagnostic data for enabling determination of the dynamic performance of said valve assembly under test.

2. The method of claim 1, wherein said valve actuator includes a valve actuator spring, including the steps of:

providing a valve actuator pressure sensor to sense varying pressure at the input of the valve actuator;

obtaining a third signal from the valve actuator pressure sensor corresponding to varying pressure at the valve actuator input during the test operation cycle;

processing said output signal from the position sensor corresponding to movement of the flow control member and said third signal to derive valve diagnostic data representing the variation in pressure at the valve actuator input as a function of movement of the flow control member during the test operation cycle; and displaying said valve diagnostic data for enabling determination of the characteristics of said valve actuator spring for said valve assembly under test.

3. The method of claim 2, including displaying said valve diagnostic data for enabling determination of the valve actuator spring adjustment values for said valve assembly under test.

4. The method of claim 3, including displaying said valve diagnostic data for enabling determination of the valve actuator spring constant values for said valve assembly under test.

5. The method of claim 1, wherein said valve flow control member is moved between respective closed and open valve positions with respect to a valve seat, including the steps of:

providing a valve actuator pressure sensor to sense varying pressure at the input of the valve actuator;

obtaining a third signal from the valve actuator pressure sensor corresponding to varying pressure at the valve actuator input during the dynamic test operation cycle for flow control member movements encompassing the fully closed valve position wherein said flow control member is seated on the valve seat;

obtaining said output signal during the dynamic test operation cycle for flow control member movements encompassing the fully closed valve positions;

processing said third signal and said output signal to derive valve diagnostic data representing the variation in pressure at the valve actuator input as a function of movement of the flow control member during the dynamic test operation cycle corresponding to flow control member movements encompassing the fully closed valve position; and displaying said valve diagnostic data for enabling determination of the seating conditions of said flow control member on the valve seat for said valve assembly under test;

including the steps of displaying pressure values between at least two pneumatic pressure values at the end of the dynamic test operation cycle corresponding to closing of the valve as the flow control member initially contacts the valve seat and continuing until it is then totally seated against the valve seat, said two pneumatic pressure values including a pressure value (1) at the first point in flow control member travel where the pneumatic pressure initially abruptly changes in value at the end of the dynamic test operation cycle and a pressure vale (2) at the second point in the continued travel of the flow control member where the maximum pneumatic pressure value is reached and the pressure again abruptly changes as the flow control member travel direction is reversed.

6. The method of claim 7, including the steps of:

providing a pressure sensor to sense said controlled variable pneumatic pressure at the input of the valve positioner;

obtaining a third signal from the pressure sensor corresponding to said controlled varying pressure at the valve positioner input during the dynamic test operation cycle;

processing said variable control current signal and said third signal to provide valve diagnostic data corresponding to variations in the variable pneumatic pressure line connected to the valve positioner as a function of said variable control signal during said test operation cycle; and displaying said valve diagnostic data and enabling determination of current to pressure transducer calibration values for said valve under test.

* * * * *

UNITED STATES PATENT AND TRADEMARK OFFICE
CERTIFICATE OF CORRECTION

PATENT NO. : 5,109,692

DATED : May 5, 1992

INVENTOR(S) : WILLIAM V. FITZGERALD

It is certified that error appears in the above-indentified patent and that said Letters Patent is hereby corrected as shown below:

Col. 2, line 33, change "pressure times" to --air pressure times--.

Col. 2, line 43, change "p" to --plug--.

Col. 4, line 54, change "(Ff) + FU2" to --(Ff) + FU1--.

Col. 5, line 14, after "movement", insert --.--.

Col. 6, line 20, change "6" to --61--.

Col. 47, line 13, change "channel to pressure" to --current to pressure--.

Col. 48, lines 18-19, change "positions;" to --position;--.

Col. 48, line 42, change "vale" to --value--.

UNITED STATES PATENT AND TRADEMARK OFFICE
CERTIFICATE OF CORRECTION

PATENT NO. : 5,109,692
DATED : May 5, 1992
INVENTOR(S) : WILLIAM V. FITZGERALD

It is certified that error appears in the above-indentified patent and that said Letters Patent is hereby corrected as shown below:

Col. 48, line 47, change "claim 7" to --claim 1--.

Signed and Sealed this

Twenty-third Day of November, 1993

Attest:

BRUCE LEHMAN

Attesting Officer       Commissioner of Patents and Trademarks